US012153372B2

(12) United States Patent
Ohmori et al.

(10) Patent No.: US 12,153,372 B2
(45) Date of Patent: Nov. 26, 2024

(54) CLEANING BLADE, LUBRICANT LEVELING BLADE, PROCESS CARTRIDGE, AND IMAGE FORMING APPARATUS

(71) Applicants: Masahiro Ohmori, Kanagawa (JP); Keiichiro Juri, Kanagawa (JP); Hideki Kimura, Kanagawa (JP)

(72) Inventors: Masahiro Ohmori, Kanagawa (JP); Keiichiro Juri, Kanagawa (JP); Hideki Kimura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/275,215

(22) PCT Filed: Jan. 27, 2022

(86) PCT No.: PCT/IB2022/050696

§ 371 (c)(1),
(2) Date: Aug. 1, 2023

(87) PCT Pub. No.: WO2022/172111

PCT Pub. Date: Aug. 18, 2022

(65) Prior Publication Data

US 2024/0255889 A1 Aug. 1, 2024

(30) Foreign Application Priority Data

Feb. 15, 2021 (JP) ................................ 2021-021849
Jun. 29, 2021 (JP) ................................ 2021-107228

(51) Int. Cl.
*G03G 21/00* (2006.01)
*G03G 21/18* (2006.01)

(52) U.S. Cl.
CPC ..... *G03G 21/0017* (2013.01); *G03G 21/0094* (2013.01); *G03G 21/1814* (2013.01)

(58) Field of Classification Search
CPC ........... G03G 21/0011; G03G 21/0017; G03G 21/0094; G03G 21/1814
See application file for complete search history.

(56) References Cited

U.S. PATENT DOCUMENTS

2014/0341629 A1* 11/2014 Watanabe .......... G03G 21/0017 399/350
2015/0014602 A1 1/2015 Matsushita et al.
(Continued)

FOREIGN PATENT DOCUMENTS

JP 59-005259 1/1984
JP 6-348193 12/1994
(Continued)

OTHER PUBLICATIONS

International Search Report and Written Opinion issued on May 9, 2022 in PCT/IB2022/050696 filed on Jan. 27, 2022, 8 pages.

*Primary Examiner* — Hoang X Ngo
(74) *Attorney, Agent, or Firm* — XSENSUS LLP

(57) ABSTRACT

A cleaning blade for cleaning a rotating body is provided. The cleaning blade includes: an edge layer having a tip portion that comes into contact with the rotating body; and a coating layer on the tip portion of the edge layer. The coating layer contains a first fluorine-based resin and a second fluorine-based resin incompatible with the first fluorine-based resin. The cleaning blade has a Martens hardness of from 0.5 to 3 $N/mm^2$ at a position 20 μm distant from a tip edge portion of the edge layer.

15 Claims, 7 Drawing Sheets

(56) References Cited

U.S. PATENT DOCUMENTS

| | | | |
|---|---|---|---|
| 2015/0253722 A1 | 9/2015 | Sakaguchi et al. | |
| 2017/0003643 A1 | 1/2017 | Aoyama et al. | |
| 2017/0038724 A1 * | 2/2017 | Shimizu ............. | G03G 21/0017 |
| 2020/0233365 A1 | 7/2020 | Kimura et al. | |
| 2021/0200136 A1 | 7/2021 | Juri et al. | |
| 2021/0230353 A1 | 7/2021 | Aoyama et al. | |
| 2022/0221817 A1 | 7/2022 | Juri et al. | |

FOREIGN PATENT DOCUMENTS

| | | |
|---|---|---|
| JP | 7-306616 | 11/1995 |
| JP | 8-220962 | 8/1996 |
| JP | 9-258632 | 10/1997 |
| JP | 10-214009 | 8/1998 |
| JP | 2000-147972 | 5/2000 |
| JP | 2004-101551 | 4/2004 |
| JP | 2010-134310 | 6/2010 |
| JP | 2015-014744 | 1/2015 |
| JP | 2017-016083 | 1/2017 |
| JP | 2022-107347 | 7/2022 |

* cited by examiner

CLEANING BLADE, LUBRICANT LEVELING BLADE, PROCESS CARTRIDGE, AND IMAGE FORMING APPARATUS

The present application is based on PCT filing PCT/IB2022/050696, filed on Jan. 27, 2022, JP 2021-021849, filed on Feb. 15, 2021, and JP 2021-107228, filed Jun. 29, 2021, the entire contents of each of which are incorporated herein by reference.

TECHNICAL FIELD

The present disclosure relates to a cleaning blade, a lubricant leveling blade, a process cartridge, and an image forming apparatus.

BACKGROUND ART

In electrophotographic image forming processes, a cleaning device that removes residual toner adhering to a surface of an image bearer is used. As the cleaning device, a cleaning blade composed of an elastic body made of polyurethane rubber and a support supporting the elastic body is widely used. After the cleaning blade has cleaned the image bearer, a lubricant supply device supplies a lubricant to the surface of the image bearer. As the lubricant supply device, a lubricant leveling blade composed of an elastic body made of polyurethane rubber and a support supporting the elastic body is widely used. It is known that a lubricant, such as a metal soap, is applied to the tip edge portion of the elastic body of each of the cleaning blade and lubricant leveling blade.

The cleaning blade and the lubricant leveling blade are required to have lubricity for preventing an increase in torque, which is a force necessary for rotating the image bearer, and reducing a frictional force with the image bearer. In addition, the lubricant applied to the cleaning blade and lubricant leveling blade is required to have an adhesive force to their substrates to be prevented from being detached therefrom.

In attempting to reduce a frictional force between the cleaning blade and the image bearer, a cleaning blade coated with a lubricant containing a fluorine-based compound has been proposed, where the fluorine-based compound is vinylidene fluoride (for example, as in Patent Literatures 1 to 5). In attempting to impart appropriate flexibility and hardness to the elastic body of the cleaning blade and preventing curling or gouging wear of the tip edge portion of the cleaning blade, a cleaning blade having a Martens hardness of from 1.0 to 15.0 N/mm$^2$ at a position 20 μm distant from the tip edge portion of the elastic body has been proposed (for example, as in Patent Literature 6). Further, in attempting to improve slidability of the cleaning blade, a cleaning blade coated with a dispersion of PMMA (i.e., polymethacrylic acid) particles in a fluorine-based solvent has been proposed (for example, as in Patent Literature 7).

CITATION LIST

Patent Literature

PTL 1

Japanese Unexamined Patent Application Publication No. 2000-147972

2

PTL 2

Japanese Unexamined Patent Application Publication No. 2004-101551

PTL 3

Japanese Patent No. 3278733

PTL 4

Japanese Unexamined Patent Application Publication No. H10-214009

PTL 5

Japanese Unexamined Patent Application Publication No. H6-348193

PTL 6

Japanese Unexamined Patent Application Publication No. 2017-16083

PTL 7

Japanese Patent No. 2853598

SUMMARY OF INVENTION

Technical Problem

An object of the present invention is to provide a cleaning blade capable of reducing an increase in torque even immediately after the start of use of an image forming apparatus to exhibit excellent cleaning performance.

Solution to Problem

Embodiments of the present invention provide a cleaning blade for cleaning a rotating body. The cleaning blade includes: an edge layer having a tip portion that comes into contact with the rotating body; and a coating layer on the tip portion of the edge layer. The coating layer contains a first fluorine-based resin and a second fluorine-based resin incompatible with the first fluorine-based resin. The cleaning blade has a Martens hardness of from 0.5 to 3 N/mm$^2$ at a position 20 μm distant from a tip edge portion of the edge layer.

Embodiments of the present invention provide a lubricant leveling blade for leveling a lubricant applied onto a rotating body. The lubricant leveling blade includes: an edge layer having a tip portion that comes into contact with the rotating body; and a coating layer on the tip portion of the edge layer. The coating layer contains a first fluorine-based resin and a second fluorine-based resin incompatible with the first fluorine-based resin. The lubricant leveling blade has a Martens hardness of from 0.5 to 3 N/mm$^2$ at a position 20 μm distant from a tip edge portion of the edge layer.

Embodiments of the present invention provide a process cartridge. The process cartridge includes: an image bearer; at least one of a charger to charge a surface of the image bearer, an irradiator to irradiate the charged surface of the image bearer to form an electrostatic latent image, a developing device to develop the electrostatic latent image into a visible image, or a transfer device to transfer the visible image onto a recording medium; and a cleaning device to remove a residue on the surface of the image bearer that contains the above-described cleaning blade.

Embodiments of the present invention provide an image forming apparatus. The image forming apparatus includes: an image bearer; a charger to charge a surface of the image bearer; an irradiator to irradiate the charged surface of the image bearer to form an electrostatic latent image; a developing device to develop the electrostatic latent image into a visible image; a transfer device to transfer the visible image onto a recording medium; a fixing device to fix the transferred visible image on the recording medium; and a cleaning device to remove a residue on the surface of the image bearer that contains the above-described cleaning blade.

Advantageous Effects of Invention

In accordance with some embodiments of the present invention, a cleaning blade is provided that is capable of reducing an increase in torque even immediately after the start of use of an image forming apparatus to exhibit excellent cleaning performance.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
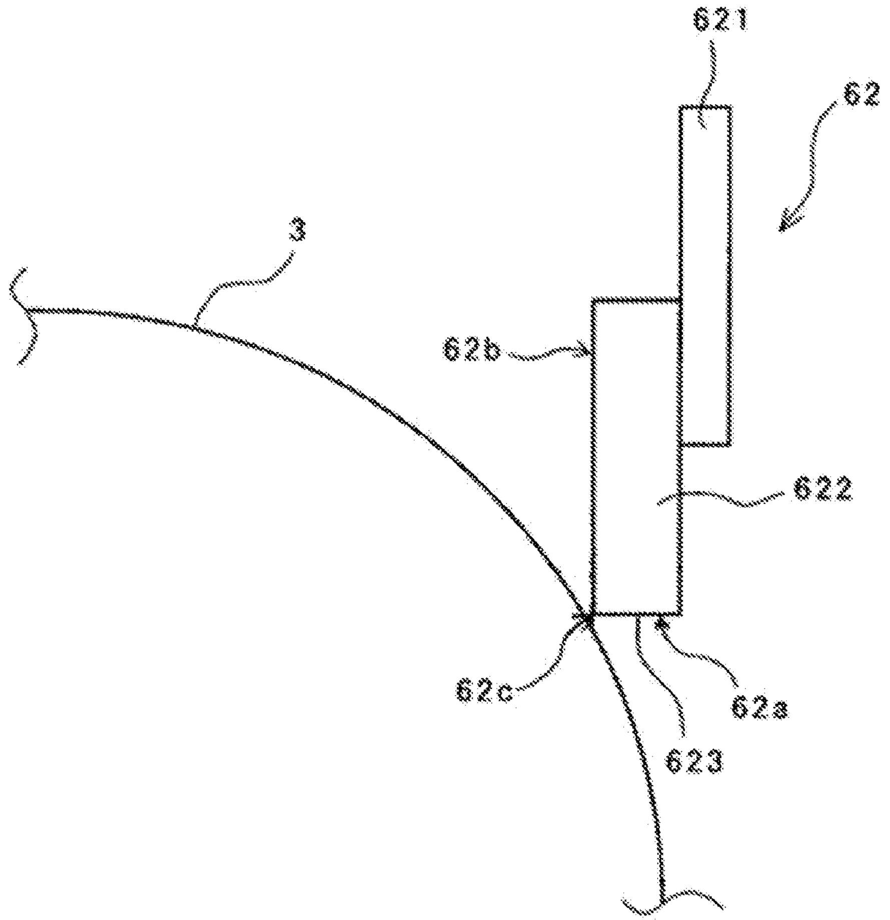
FIG. 1 is a schematic cross-sectional diagram illustrating a cleaning blade according to an embodiment of the present invention, in contact with a surface of a rotating body.

The terminology used herein is for the purpose of describing particular embodiments only and is not intended to be limiting of the present invention. As used herein, the singular forms “a,” “an,” and “the” are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Cleaning Blade

A cleaning blade of the present embodiment is for cleaning a rotating body. The cleaning blade comprises an edge layer and a coating layer. The edge layer has a tip portion that comes into contact with the rotating body. The coating layer is disposed on the tip portion of the edge layer. The coating layer contains a first fluorine-based resin and a second fluorine-based resin incompatible with the first fluorine-based resin. The cleaning blade has a Martens hardness of from 0.5 to 3 N/mm$^2$ at a position 20 μm distant from a tip edge portion of the edge layer. The cleaning blade may further include other members, as necessary.

The cleaning blade of the present embodiment comes into contact with a surface of a rotating body to remove a residue adhering to the rotating body.

The residue is not particularly limited as long as it is adhering to the surface of the rotating body and is to be removed by the cleaning blade. Examples of the residue include, but are not limited to, toner, lubricant, inorganic particles, organic particles, dust, and mixtures thereof.

A conventional cleaning blade has a drawback that, as the cleaning blade comes into contact with the rotating body (e.g., image bearer), the torque that is a force required for rotating the rotating body increases due to friction generated between the cleaning blade and the rotating body, and the rotating body thereby stops rotating. In addition, due to the friction, the contact portion of the cleaning blade with the rotating body gets worn. The cleaning blade thereby turns up and allows toner to slip therethrough, resulting in defective cleaning.

In attempting to improve slidability of the cleaning blade and preventing the cleaning blade from turning up or increasing the torque, a process called “touch-up” is widely employed for applying a lubricant, such as a metal soap (e.g., zinc stearate) and PMMA (i.e., polymethacrylic acid) particles, to the tip portion of the cleaning blade. Normally, with the operation of the image forming apparatus, toner gradually accumulates between the cleaning blade and the image bearer and functions as a lubricant. Therefore, the lubricant needs to exhibit a lubricating property for a short period of time from when the image forming apparatus starts operating until the behavior of the cleaning blade gets stabilized. However, fine particles contained in the conventional lubricant have a weak adhesive force to the substrate and undesirably detach from the cleaning blade before the behavior of the cleaning blade gets stabilized.

It is known that prevention of an increase in torque and improvement in the cleaning performance are in a trade-off relationship.

When the contact part of the cleaning blade with the rotating body is smoothened by application of a lubricant thereto for the purpose of preventing an increase in torque, toner is allowed to pass through the contact part, resulting in deterioration of the cleaning performance.

When the contact part of the cleaning blade with the rotating body is made uneven to increase a frictional force for the purpose of improving the cleaning performance, the torque increases. It has been difficult to prevent an increase in torque and to improve the cleaning performance at the same time.

As a result of diligent studies, the inventors of the present invention have found that detachment of particles can be prevented by forming a coating layer on the cleaning blade by applying a liquid dispersion of the particles in a mixture of a solvent and a binder component, rather than a liquid dispersion of the particles only in a solvent. Further, the inventors have found that the use of fluorine-based materials having slidability for the particles and the binder component can prevent either the cleaning blade from turning up or the torque of the image bearer from increasing.

In addition, the present inventors have found that when the Martens hardness at a position 20 μm distant from the tip edge portion of the edge layer is from 0.5 to 3 $N/mm^2$, a sliding effect is exerted without adversely affecting the cleaning function.

Accordingly, the cleaning blade of the present embodiment is for cleaning a rotating body. The cleaning blade comprises an edge layer and a coating layer. The edge layer has a tip portion that comes into contact with the rotating body. The coating layer is disposed on the tip portion of the edge layer. The coating layer contains a first fluorine-based resin and a second fluorine-based resin incompatible with the first fluorine-based resin. The cleaning blade has a Martens hardness of from 0.5 to 3 $N/mm^2$ at a position 20 μm distant from a tip edge portion of the edge layer. This cleaning blade is capable of reducing an increase in torque even immediately after the start of use of an image forming apparatus to exhibit excellent cleaning performance.

Coating Layer

The coating layer contains a first fluorine-based resin and a second fluorine-based resin incompatible with the first fluorine-based resin, and further contains other components as necessary.

The coating layer refers to a layer provided on one end portion on peripheral side surfaces of a blade substrate (to be described later), which is used as a tip of the cleaning blade.

The coating layer may be formed on at least a part of the blade substrate, including a contact edge of the cleaning blade that comes into contact with the rotating body. The coating layer may be formed on the entire of the contact edge, or on the entire surface of the blade substrate. Among these, it is preferable that the coating layer be formed on the entire of the contact edge.

In the present disclosure, a surface region of the blade substrate where the coating layer is not provided may be referred to as a non-coating region.

In the present disclosure, "incompatibility" refers to a property of multiple substances incompletely mixed with each other with forming interfaces therebetween, and "compatibility" refers to a property of multiple substances completely mixed with each other without forming interfaces therebetween.

In the present disclosure, "incompatible state" refers to a state in which an interface is present between the first fluorine-based resin and the second fluorine-based resin, where a part thereof may be compatibilized.

In one preferred embodiment of the incompatible state, the coating layer has a sea-island structure.

The sea-island structure refers to a structure of the coating layer formed on the cleaning blade, in which a continuous phase of one component is expressed as "sea (or "matrix")" and other components are expressed as "islands (or "domains")" formed in the "sea".

In the present disclosure, the sea-island structure indicates a state in which the first fluorine-based resin serving as domains and the second fluorine-based resin serving as a matrix are incompatible with each other and no compatibilized portion is present.

When the coating layer has such a sea-island structure, it is preferable that the domains be in the form of particles.

Preferably, the coating layer of the cleaning blade has an average thickness of from 2 to 10 μm.

When the average thickness of the coating layer is 2 μm or more, the sliding effect is sufficiently exerted. When the average thickness of the coating layer is 10 μm or less, the coating layer is prevented from falling off.

The average thickness of the coating layer may be an average value of thicknesses (μm) measured at three or more positions of the coating layer.

The positions at which the thickness of the coating layer is measured are not particularly limited, and may include a position 20 μm distant from both end portions of the coating layer and a central portion of the coating layer.

The average thickness of the coating layer can be measured by scraping off a part of the coating layer with a spatula, a cotton swab, or the like and measuring the shape thereof using a three-dimensional measuring instrument such as a contact surface roughness meter (SURFTEST SJ-500, product of Mitutoyo Corporation) or a laser microscope (LEXT OLS4100, product of Olympus Corporation).

The cleaning blade according to an embodiment of the present invention is described below with reference to the drawings. The applications of the cleaning blade are provided herein for the purpose of illustration only and are not intended to be limiting.

In each drawing, the same reference numerals are given to the same components, and redundant explanation may be omitted. The number, position, shape, and the like of the constituent members are not limited to those in the embodiments described below, and can be suitably set to suit to a particular application.

Figure 2:
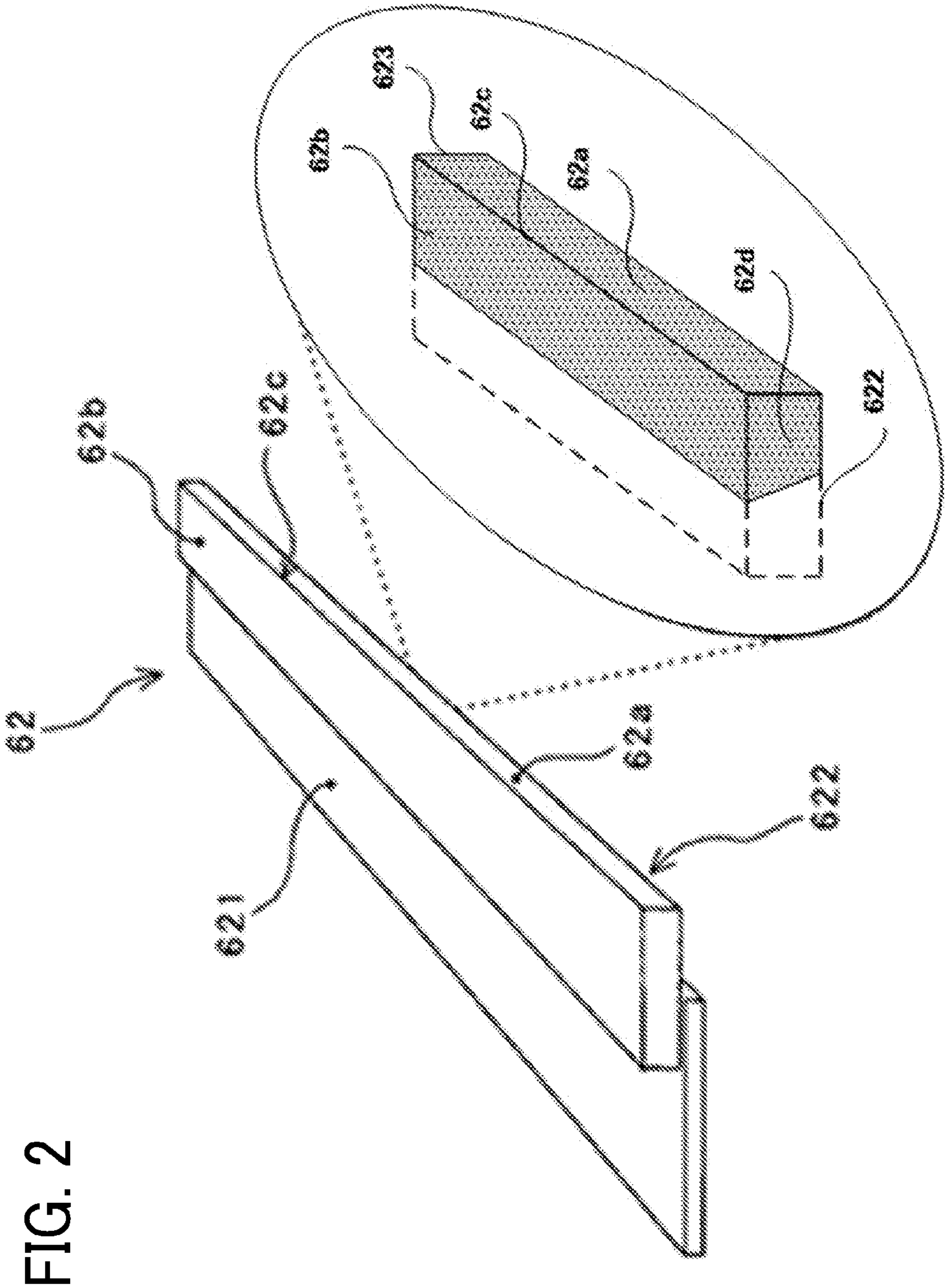
FIG. 2 is a schematic perspective view of the cleaning blade illustrated in FIG. 1.

FIG. 1 is a schematic cross-sectional diagram illustrating a cleaning blade of the present embodiment in contact with a surface of a rotating body. FIG. 2 is a perspective view of the cleaning blade in FIG. 1 including an enlarged view of the vicinity of its contact part. A cleaning blade 62 includes a cleaning blade support 621 and a cleaning blade substrate 622. The cleaning blade support 621 is a flat plate made of a rigid material such as metal or hard plastic. The cleaning blade substrate 622 has one end coupled to the cleaning blade support 621 and the other end being a free end having a specific length. The cleaning blade substrate 622 is fixed to one end portion of the cleaning blade support 621 with an adhesive or the like. The other end portion of the cleaning blade support 621 is supported by a casing of a cleaning device in a cantilever manner. The cleaning blade substrate 622 has a cleaning blade tip surface 62*a*, a cleaning blade lower surface 62*b*, a cleaning blade contact part 62*c* that is one end of the cleaning blade substrate 622 on the free end side, and a cleaning blade side surface 62*d*. Further, the cleaning blade substrate 622 has a coating layer 623 in at least a part including a contact edge in the cleaning blade contact part 62*c*.

The cleaning blade 62 is disposed such that the cleaning blade contact part 62*c* is in contact with a photoconductor 3 along the longitudinal direction.

Figure 3:
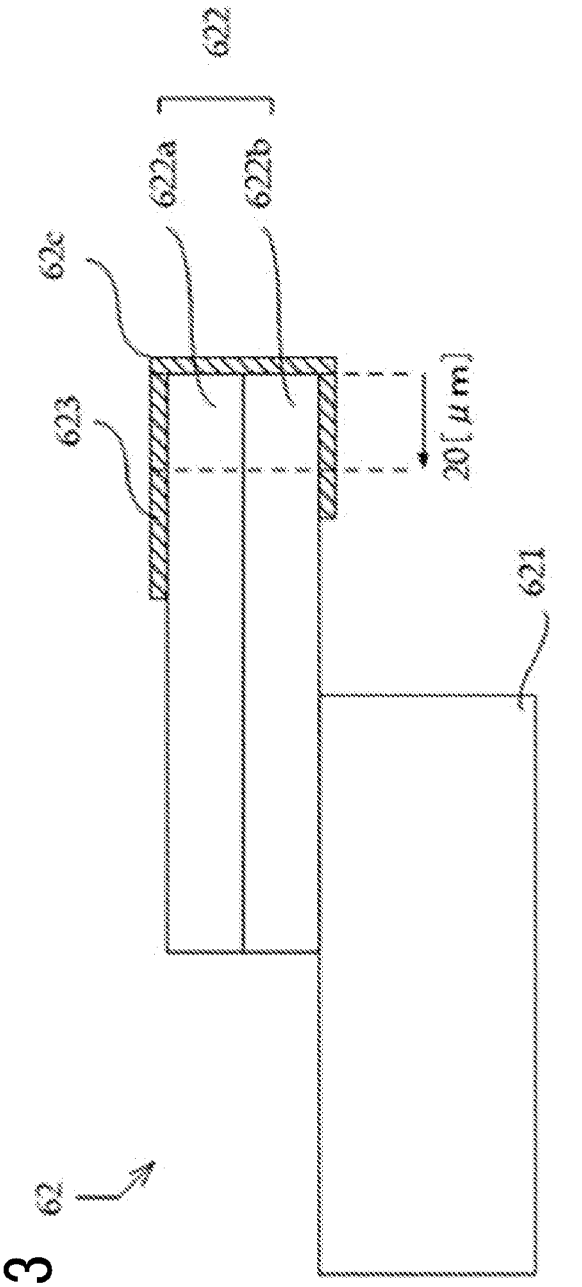
FIG. 3 is a schematic cross-sectional view of another cleaning blade according to an embodiment of the present invention.

FIG. 3 is a cross-sectional diagram of a cleaning blade according to another embodiment of the present invention. A cleaning blade 62 includes a cleaning blade support 621 and a cleaning blade substrate 622. The cleaning blade substrate 622 includes an edge layer 622*a* and a base layer 622*b* both having elasticity, a contact part 62*c*, and a coating layer 623 in at least a part including a contact edge in the contact part 62*c*. The cleaning blade tip surface 62*a*, the cleaning blade lower surface 62*b*, and the cleaning blade side surface 62*d* are omitted from the drawing.

First Fluorine-Based Resin

In the present disclosure, the fluorine-based resin refers to a resin containing fluorine in its molecule. The fluorine-based resin is preferably an olefin polymer containing fluorine, and more preferably an olefin polymer in which hydrogen atoms are substituted with fluorine atoms.

In one preferred embodiment of the present invention, the first fluorine-based resin forms domains in the sea-island structure of the coating layer.

Preferably, the type and addition amount of the first fluorine-based resin is so selected that the first fluorine-based resin can form domains in the second fluorine-based resin.

The shapes of the domains are not particularly limited and may be suitably selected to suit to a particular application, and may be either regular or irregular. Preferably, the shapes of the domains are regular.

When the shapes of the domains are regular, it is preferable that the shapes be spherical.

When the shapes of the domains are spherical, it is preferable that the domains be in the form of particles.

The fluorine-based resin in such a shape is prevented, when fallen off from the coating layer, from damaging the rotating body or the blade substrate of the cleaning blade.

The volume average particle diameter (e.g., 50% volume diameter, median diameter) of the first fluorine-based resin is not particularly limited and can be suitably selected to suit to a particular application, but is preferably from 0.1 to 1 μm, more preferably 0.5 μm or less, and still more preferably 0.3 μm or less. When the volume average particle diameter is 1 μm or less, the first fluorine-based resin is prevented from being precipitated and unstably dispersed in a solvent. When the volume average particle diameter is 0.5 μm or less, the first fluorine-based resin can be more stably dispersed in a non-aqueous solvent.

A method for measuring the volume average particle diameter (e.g., 50% volume diameter, median diameter) is not particularly limited and can be suitably selected to suit to a particular application, and may be laser diffraction/scattering, dynamic light scattering, or imaging.

The volume average particle diameter may be measured, for example, by collecting the particles from the coating layer of the cleaning blade and subjecting the particles to a laser diffraction/scattering measurement using an instrument MICROTRAC (product of Nikkiso Co., Ltd.), or by directly observing and measuring the particles on the cleaning blade using a scanning electron microscope (SEM).

The volume average particle diameter of the particles present in the coating layer is almost the same as that of the particles before being added to the dispersion liquid to be applied to the cleaning blade.

The proportion of the first fluorine-based resin in the coating layer is not particularly limited and may be suitably selected to suit to a particular application. To achieve the sliding effect, the proportion is preferably from 4% to 8% by mass, and more preferably from 4.5% to 5.5% by mass. The sliding effect achieved by inclusion of the first fluorine-based resin is maximized when the proportion of the first fluorine-based resin in the coating layer is 8% by mass. When the proportion of the first fluorine-based resin in the coating layer is 4% by mass or more, the sliding effect is sufficiently exerted.

Specific examples of the first fluorine-based resin include, but are not limited to, polytetrafluoroethylene (PTFE), fluorinated ethylene-propylene copolymer (FEP), perfluoroalkoxy polymer (PFA), chlorotrifluoroethylene copolymer (CTFE), tetrafluoroethylene-chlorotrifluoroethylene copolymer (TFE/CTFE), ethylene-chlorotrifluoroethylene copolymer (ECTFE), and polychlorotrifluoroethylene (PCTFE). Among these, polytetrafluoroethylene (PTFE) is preferred for further improving the slidability of the cleaning blade.

The polytetrafluoroethylene (PTFE) is available either by synthesis or from commercial products.

Specific examples of commercial products of the polytetrafluoroethylene (PTFE) include, but are not limited to, DYNEON TF MICROPOWDER TF-9201Z and DYNEON TF MICROPOWDER TF-9207Z (products of 3M Company), NanoFLON 119N and FLUORO E (products of Shamrock Technologies). TLP10F-1 (product of DuPont-Mitsui Fluorochemicals, Co., Ltd.), KTL-500F (product of KITAMURA LIMITED), and ALGOFLON L203F (product of Solvay S.A.).

Second Fluorine-Based Resin

In the present embodiment, the coating layer further contains the second fluorine-based resin to improve the adhesive force of the first fluorine-based resin to the cleaning blade substrate and prevent detachment of the coating layer. Thus, the cleaning blade is prevented from turning up, and an increase in torque is prevented.

In one preferred embodiment of the present invention, the second fluorine-based resin forms a matrix in the sea-island structure of the coating layer.

Preferably, the type and addition amount of the second fluorine-based resin is so selected that the second fluorine-based resin can form a matrix for the first fluorine-based resin.

The second fluorine-based resin is not particularly limited and may be suitably selected to suit to a particular application as long as the first fluorine-based resin can be uniformly and stably dispersed therein. Specific examples thereof include, but are not limited to, vinylidene fluoride (VdF), hexafluoropropylene (HFP), and tetrafluoroethylene (TFE). Among these, for improving lubricity and adhesion to the blade substrate, a copolymer of these materials is preferred, and a VdF-HFP-TFE terpolymer is more preferred.

Preferably, the proportions of VdF, HFP, and TFE in the VdF-HFP-TFE terpolymer are 30% to 80% by mol. 10% to 35% by mol, and 5% to 35% by mol, respectively, for imparting flexibility to the blade and solubility in solvents.

The second fluorine-based resin may be mixed with a fluorine-based oil.

The fluorine-based oil improves not only a binder function but also a sliding function. Specific examples of the fluorine-based oil include, but are not limited to, those having a tetrafluoroethylene (TFE) oligomer or a perfluoroether as the main backbone.

In the case of a mixture of the second fluorine-based resin with the fluorine-based oil, the proportion of the second fluorine-based resin in the mixture is preferably from 90% to 99% by mass, more preferably from 95% to 98% by mass, for preventing the fluorine-based oil from bleeding out and contaminating a photoconductor.

The fluorine-based oil having a perfluoroether as the main backbone is not particularly limited and can be suitably selected to suit to a particular application as long as it has slidability and does not inhibit dispersion of the fluorine-based resin. Considering kinematic viscosity, those having an average molecular weight of from 2,000 to 3,500 are preferred.

In the present disclosure, the first fluorine-based resin and the second fluorine-based resin may be either the same materials or different materials. When the first fluorine-based resin and the second fluorine-based resin are the same materials, the coating layer can be formed by a method of putting the first fluorine-based resin and the second fluorine-based resin into an incompatible state. For example, when the first fluorine-based resin is cured in advance and the second fluorine-based resin is added thereto and cured, an interface is formed between the first fluorine-based resin and the second fluorine-based resin, thus forming a coating layer in which the first fluorine-based resin and the second fluorine-based resin are partially incompatible. The coating layer can also be formed by adding a hydrophilic substituent to the first fluorine-based resin and adding a hydrophobic substituent to the second fluorine-based resin.

Other Components

The other components are not particularly limited and may be suitably selected to suit to a particular application. Specific examples thereof include, but are not limited to, non-fluorine-based resin particles that are not composed of the fluorine-based resin described above.

The non-fluorine-based resin particles are not particularly limited and may be suitably selected to suit to a particular application. Specific examples thereof include particles of inorganic compounds, acrylic resins, styrene resins, and vinyl resins.

Specific examples of the inorganic compound particles include, but are not limited to, silica, alumina, and zirconia.

Each of these can be used alone or in combination with others.

The shapes of the non-fluorine-based resin particles are not particularly limited and can be suitably selected to suit to a particular application, but the non-fluorine-based resin particles are preferably spherical. The non-fluorine-based resin particles in such a shape are prevented, when fallen off from the coating layer, from damaging the rotating body or the blade substrate of the cleaning blade.

The volume average particle diameter (e.g., 50% volume diameter, median diameter) of the non-fluorine-based resin particles is not particularly limited and can be suitably selected to suit to a particular application, but is preferably from 0.1 to 1 μm, more preferably 0.5 μm or less, and still more preferably 0.3 μm or less. When the volume average particle diameter is 1 μm or less, the non-fluorine-based resin particles are prevented from being precipitated and unstably dispersed in a solvent. When the volume average particle diameter is 0.5 μm or less, the non-fluorine-based resin particles can be more stably dispersed in a non-aqueous solvent.

A method for measuring the volume average particle diameter (e.g., 50% volume diameter, median diameter) is not particularly limited and can be suitably selected to suit to a particular application, and may be laser diffraction/scattering, dynamic light scattering, or imaging.

The volume average particle diameter may be measured, for example, by collecting the particles from the coating layer of the cleaning blade and subjecting the particles to a laser diffraction/scattering measurement using an instrument MICROTRAC (product of Nikkiso Co., Ltd.), or by directly observing and measuring the particles on the cleaning blade using a scanning electron microscope (SEM).

A method for forming the coating layer is not particularly limited and can be suitably selected to suit to a particular application. For example, the coating layer can be formed by adding the first fluorine-based resin to a mixture (i.e., a second fluorine-based resin dispersion) of a solvent and the second fluorine-based resin, mixing them, and applying the resulting particle dispersion to the blade substrate of the cleaning blade.

The solvent is not particularly limited and can be suitably selected to suit to a particular application. Examples thereof include fluorine-containing organic solvents.

Specific examples of the fluorine-containing organic solvents include, but are not limited to, hydrofluoroether (HFE), perfluorocarbon (PFC), and perfluoroether (PFE).

Each of these can be used alone or in combination with others.

Preferably, an average particle diameter of the particles in the second fluorine-based resin dispersion measured by a dynamic light scattering method (e.g., an average particle diameter measured by a cumulant analysis method in scattering intensity distribution) is 1 μm or less, more preferably 0.5 μm or less, and even more preferably 0.3 μm or less.

Generally, fine particles having a volume average particle diameter of 1 μm or less usually agglomerate into secondary particles having a particle diameter of 1 μm or more. Thus, when the secondary particles formed by agglomeration are dispersed in a manner that they have a particle diameter of 1 μm or less, the second fluorine-based resin dispersion is maintained stable even when stored at a low viscosity for a long period of time.

The dispersing method is not particularly limited and can be suitably selected to suit to a particular application. Specific examples thereof include, but are not limited to, methods using a disperser such as ultrasonic disperser, three roll mill, ball mill, bead mill, and jet mill.

A method for forming the coating layer is not particularly limited and can be suitably selected to suit to a particular application. Examples thereof include, but are not limited to, dipping in which the entire or a part of the blade substrate of the cleaning blade is dipped in a particle dispersion. In addition to dipping, spray coating or dispenser coating may also be employed.

Blade Substrate

In the present disclosure, the blade substrate of the cleaning blade may also be simply referred to as “substrate”.

The shape of the blade substrate may be suitably selected to suit to a particular application as long as the blade substrate has a structure capable of removing a residue on the rotating body. Preferably, the contact edge in the contact part of the blade substrate that comes into contact with the rotating body is linear. The blade substrate may have, for example, a plate shape.

The structure of the blade substrate is not particularly limited and can be suitably selected to suit to a particular application. Examples thereof include, but are not limited to, a monolayer structure, a laminated structure, and a laminated structure which combines multiple members. Among these, a monolayer structure and a laminated structure which combines multiple members are preferred in view of easy processing into the cleaning blade.

In the case in which the blade substrate has a laminated structure, a layer abutting the rotating body may be referred to as an edge layer, and a layer other than the edge layer may be referred to as a base layer. In the case in which the blade substrate has a monolayer structure, the blade substrate consists only of an edge layer.

In the case of a laminated structure which combines multiple members, it is preferable that the Martens hardness values of the multiple members be different from each other.

The material of the blade substrate is not particularly limited and can be suitably selected to suit to a particular application. For preventing wear of the blade substrate and sufficiently removing the residue from the rotating body, it is preferable that the material have appropriate elasticity and hardness. The material of the blade substrate may be, for example, an elastic material.

The elastic material is not particularly limited and may be suitably selected to suit to a particular application as long as it has high elasticity. Specific examples thereof include, but are not limited to, polyurethane rubber, silicone rubber, fluororubber, nitrile rubber (NBR), and ethylene propylene diene rubber (EPDM). Among these, polyurethane rubber is preferred for its durability and non-staining properties.

The size of the blade substrate is not particularly limited and may be suitably selected depending on the size of the rotating body.

The Martens hardness of the polyurethane rubber in the cleaning blade of the present embodiment is not particularly limited and can be suitably selected to suit to a particular application, but is preferably from 0.5 to 2 $N/mm^2$. When the Martens hardness of the polyurethane rubber in the cleaning blade is within the above desired range, undesirable phenomena such as defective cleaning and chipping can be prevented. Here, the defective cleaning is caused when the linear pressure of the blade hardly achieves a desired level and the area of the contact part with an image bearer increases, and the chipping is caused when the blade substrate is excessively hard.

A method for producing the blade substrate is not particularly limited and can be suitably selected to suit to a particular application. For example, the blade substrate can be produced through the processes of: preparing a polyurethane prepolymer from a polyol compound and a polyisocyanate compound; adding a curing agent, optionally along with a curing catalyst, to the polyurethane prepolymer; centrifugal molding the resultant using a mold; leaving the resultant at room temperature for aging; and cutting the resultant into a flat plate having a predetermined size.

The polyol compound is not particularly limited and can be suitably selected to suit to a particular application. Examples thereof include, but are not limited to, high-molecular-weight polyols and low-molecular-weight polyols.

Specific examples of the high-molecular-weight polyols include, but are not limited to, a polyester polyol which is a condensate of an alkylene glycol and an aliphatic diprotic acid; polyester-based polyols, such as polyester polyols of alkylene glycols with adipic acid, such as ethylene adipate ester polyol, butylene adipate ester polyol, hexylene adipate ester polyol, ethylene propylene adipate ester polyol, ethylene butylene adipate ester polyol, and ethylene neopentylene adipate ester polyol; polycaprolactone-based polyols such as polycaprolactone ester polyols obtained by ring-opening polymerization of caprolactone; and polyether-based polyols such as poly(oxytetramethylene) glycol and poly(oxypropylene) glycol.

Each of these can be used alone or in combination with others.

Specific examples of the low-molecular-weight polyols include, but are not limited to, divalent alcohols such as 1,4-butanediol, ethylene glycol, neopentyl glycol, hydroquinone-bis(2-hydroxyethyl) ether, 3,3'-dichloro-4,4'-diaminodiphenylmethane, and 4,4'-diaminodiphenylmethane; and trivalent or higher polyols such as 1,1,1-trimethylolpropane, glycerin, 1,2,6-hexanetriol, 1,2,4-butanetriol, trimethylolethane, 1,1,1-tris(hydroxyethoxymethyl)propane, diglycerin, and pentaerythritol.

Each of these can be used alone or in combination with others.

The polyisocyanate compound is not particularly limited and can be suitably selected to suit to a particular application. Specific examples thereof include, but are not limited to, methylene diphenyl diisocyanate (MDI), tolylene diisocyanate (TDI), xylylene diisocyanate (XDI), naphthylene 1,5-diisocyanate (NDI), tetramethylxylene diisocyanate (TMXDI), isophorone diisocyanate (IPDI), hydrogenated xylylene diisocyanate (H6XDI), dicyclohexylmethane diisocyanate (H12MDI), hexamethylene diisocyanate (HDI), dimer acid diisocyanate (DDI), norbornene diisocyanate (NBDI), and trimethylhexamethylene diisocyanate (TMDI).

Each of these can be used alone or in combination with others.

The curing agent is not particularly limited and can be suitably selected to suit to a particular application. Examples thereof include, but are not limited to, amines and alcohols.

Each of these can be used alone or in combination with others.

The curing agent can be used to adjust the hardness of the blade substrate.

The curing catalyst is not particularly limited and can be suitably selected to suit to a particular application. Specific examples thereof include, but are not limited to, 2-methylimidazole and 1,2-dimethylimidazole.

The proportion of the curing catalyst to the total mass of the prepolymer and the curing agent is not particularly limited and can be suitably selected to suit to a particular application, but is preferably from 0.01% to 0.5% by mass, more preferably from 0.05% to 0.3% by mass.

The rebound resilience according to the Japanese Industrial Standards (JIS) K6255 of the blade substrate is not particularly limited and can be suitably selected to suit to a particular application, but is preferably from 10% to 80% at 23° C.

When the rebound resilience is within the desired range, undesirable phenomena such as defective cleaning and blade squeak can be prevented. Here, the defective cleaning occurs when the entire blade substrate has lost flexibility and becomes unable to follow the runout or roughness of the image bearer, and the blade squeak (i.e., abnormal sound) occurs when the resilience becomes too strong.

The rebound resilience of the blade substrate can be measured according to JIS K6255 at 23° C. using, for example, a resilience tester No. 221, product of Toyo Seiki Seisaku-sho. Ltd.

Martens Hardness

When the Martens hardness of the cleaning blade at a position 20 μm distant from the tip edge portion of the edge layer is from 0.5 to 3 $N/mm^2$, the sliding effect is sufficiently exerted. Preferably, the Martens hardness of the cleaning blade at a position 20 μm distant from the tip edge portion of the edge layer is from 0.5 to 2 $N/mm^2$ for exerting an excellent sliding effect. When the Martens hardness of the cleaning blade at a position 20 μm distant from the tip edge portion of the edge layer is 0.5 $N/mm^2$ or more, an undesired phenomenon in which the first fluorine-based resin and the second fluorine-based resin are not sufficiently adhering to the edge layer without achieving a desired level of the sliding effect can be prevented. When the Martens hardness of the cleaning blade at a position 20 μm distant from the tip edge portion of the edge layer is 3 $N/mm^2$ or less, an undesired phenomenon in which the first fluorine-based resin and the second fluorine-based resin are excessively adhering to the edge layer to inhibit the cleaning function can be prevented.

In the present disclosure, the measurement of the Martens hardness is performed on the cleaning blade having been processed.

The Martens hardness (HM) can be measured according to ISO 14577 using a nanoindenter (ENT-3100, product of ELIONIX INC.) by pushing a Berkovich indenter into a sample with a load of 1,000 μN for 10 seconds, holding for 5 seconds, and pulling the indenter with the same loading rate for 10 seconds.

The Martens hardness of the edge layer is measured at a position 20 μm distant from the tip edge portion of the edge layer.

The Martens hardness of the base layer may be measured at any position, but is preferably measured at a position 20 μm distant from an end portion of the base layer for ease of measurement.

The Martens hardness is the median of the numerical values measured at 4 to 6 positions.

Rotating Body

The rotating body is not particularly limited and can be suitably selected to suit to a particular application. Examples thereof include, but are not limited to, an image bearer and a photoconductor.

The structure and size of the rotating body are not particularly limited and can be suitably selected to suit to a particular application.

The material of the rotating body is not particularly limited and can be suitably selected to suit to a particular application. Examples thereof include, but are not limited to, metals, plastics, and ceramics.

The shape of the rotating body is not particularly limited and can be suitably selected to suit to a particular application. Examples thereof include, but are not limited to, a drum shape, a belt shape, a flat plate shape, and a sheet shape.

Other Members

The other members are not particularly limited and can be suitably selected to suit to a particular application. Examples thereof include, but are not limited to, a support.

Support

The shape of the support is not particularly limited and can be suitably selected to suit to a particular application. Examples thereof include, but are not limited to, a plate shape.

The structure of the support is not particularly limited and can be suitably selected to suit to a particular application.

The size of the support is not particularly limited and can be suitably selected according to the size of the rotating body.

The material of the support is not particularly limited and can be suitably selected to suit to a particular application. Examples thereof include, but are not limited to, metals, plastics, and ceramics. Among these, metals are preferred for their strength, and steels (e.g., stainless steel), aluminum, and phosphor bronze are particularly preferred.

Lubricant Leveling Blade

The cleaning blade of the present embodiment can be used as a lubricant leveling blade for leveling a lubricant applied onto the surface of the rotating body after the cleaning blade has cleaned the rotating body.

The lubricant leveling blade of the present embodiment is for leveling a lubricant applied onto a rotating body. The lubricant leveling blade comprises an edge layer and a coating layer.

The edge layer has a tip portion that comes into contact with the rotating body. The coating layer is disposed on the tip portion of the edge layer. The coating layer contains a first fluorine-based resin and a second fluorine-based resin incompatible with the first fluorine-based resin. The lubricant leveling blade has a Martens hardness of from 0.5 to 3 $N/mm^2$ at a position 20 μm distant from a tip edge portion of the edge layer. The lubricant leveling blade may further include other members, as necessary.

In the case of using the cleaning blade as a lubricant leveling blade, when the Martens hardness at a position 20 μm distant from the tip edge portion of the edge layer is from 0.5 to 3 $N/mm^2$, the lubricant applying performance is well exerted.

The lubricant leveling blade according to the present embodiment is described below with reference to the drawings.

Figure 4:
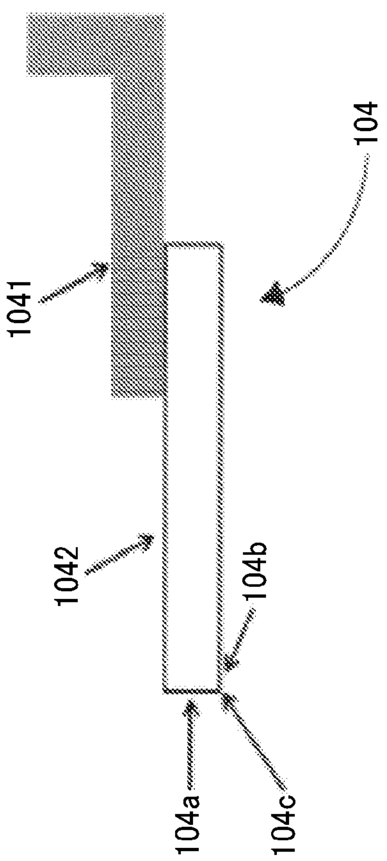
FIG. 4 is a schematic cross-sectional view of a lubricant leveling blade according to an embodiment of the present invention.
Figure 5:
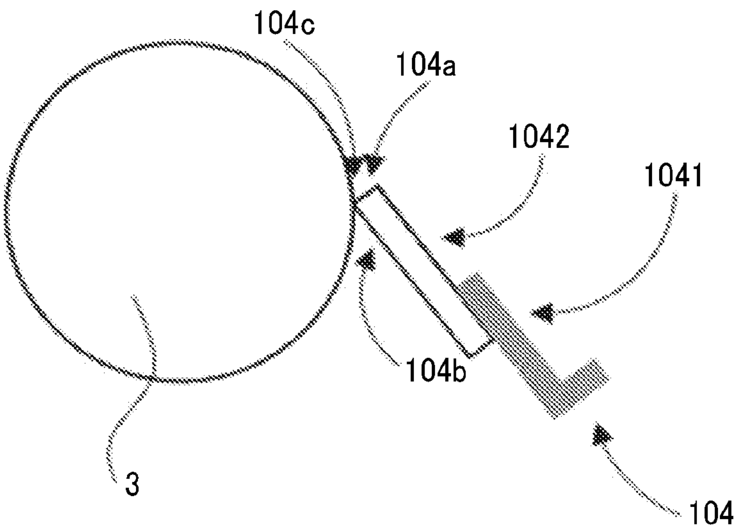
FIG. 5 is a schematic cross-sectional diagram illustrating a lubricant leveling blade according to an embodiment of the present invention, in contact with a surface of a rotating body.

FIG. 4 is a schematic cross-sectional diagram illustrating a lubricant leveling blade of the present embodiment. FIG. 5 is a schematic cross-sectional diagram illustrating the lubricant leveling blade in FIG. 4 in contact with a surface of a rotating body. A lubricant leveling blade 104 includes a lubricant leveling blade support 1041 and a lubricant leveling blade substrate 1042. The lubricant leveling blade support 1041 is a flat plate made of a rigid material such as metal or hard plastic. The lubricant leveling blade substrate 1042 has one end coupled to the lubricant leveling blade support 1041 and the other end being a free end having a specific length. The lubricant leveling blade substrate 1042 is fixed to one end portion of the lubricant leveling blade support 1041 with an adhesive or the like. The other end portion of the lubricant leveling blade support 1041 is supported by a casing of a cleaning device in a cantilever manner.

The lubricant leveling blade substrate 1042 has a lubricant leveling blade tip surface 104*a*, a lubricant leveling blade lower surface 104*b*, and a lubricant leveling blade contact part 104*c* that is one end of the lubricant leveling blade substrate 1042 on the free end side. Further, the lubricant leveling blade substrate 1042 may have the same layer structure as the cleaning blade illustrated in FIG. 3 in at least a part including a contact edge in the lubricant leveling blade contact part 104*c*.

Image Forming Apparatus and Image Forming Method

An image forming apparatus of the present embodiment includes: an image bearer; a charger to charge a surface of the image bearer; an irradiator to irradiate the charged surface of the image bearer to form an electrostatic latent image; a developing device to develop the electrostatic latent image into a visible image; a transfer device to transfer the visible image onto a recording medium; a fixing device to fix the transferred visible image on the recording medium; and a cleaning device to remove a residue (e.g., toner) on the surface of the image bearer. The image forming apparatus may further include a lubricant applying device to apply a lubricant to the surface of the image bearer and other devices as necessary.

The charger and the irradiator may be collectively referred to as an "electrostatic latent image forming device".

The cleaning device and the lubricant applying device respectively includes the cleaning blade and the lubricant leveling blade according to some embodiments of the present invention.

An image forming method of the present embodiment includes a charging process, an irradiation process, a developing process, a transfer process, a fixing process, and a cleaning process, and further includes a lubricant applying process and other processes as necessary. The charging and irradiation processes may be collectively referred to as an "electrostatic latent image forming process".

The image forming method is suitably performed by the image forming apparatus. The charging process can be performed by the charger. The irradiation process can be performed by the irradiator. The developing process can be performed by the developing device. The transfer process can be performed by the transfer device. The fixing process can be performed by the fixing device. The cleaning process can be performed by the cleaning device. The cleaning device contains the cleaning blade of the present embodiment. The lubricant applying process can be performed by the lubricant applying device, and the lubricant applying device contains the lubricant leveling blade of the present embodiment. The other processes can be performed by the other corresponding devices.

Image Bearer

The structure and size of the image bearer are not particularly limited and can be suitably selected from known ones.

The shape of the image bearer is not particularly limited and can be suitably selected to suit to a particular application. Examples thereof include, but are not limited to, a drum shape and a belt shape.

The material of the image bearer is not particularly limited and can be suitably selected to suit to a particular application. Examples thereof include, but are not limited to, inorganic photoconductors such as amorphous silicon and selenium, and organic photoconductors (OPC) such as polysilane and phthalopolymethine.

Charger and Charging Process

The charging process is a process of charging the surface of the image bearer, and is performed by the charger.

The charger is not particularly limited and can be suitably selected to suit to a particular application as long as it is capable of charging the surface of the image bearer. Specific examples thereof include, but are not limited to, contact chargers equipped with a conductive or semiconductive roller, brush, film, or rubber blade and non-contact chargers employing corona discharge such as corotron and scorotron.

The shape of the charger is determined in accordance with the specification or configuration of the image forming apparatus, and may be in the form of a roller, a magnetic brush, or a fur brush.

The magnetic brush may be composed of various ferrite particles (e.g., Zn—Cu ferrite) serving as the charger, a non-magnetic conductive sleeve for supporting the charger, and a magnet roll contained inside the conductive sleeve.

The fur brush may be made of a fur having been subjected to a conductive treatment with carbon, copper sulfide, a metal, or a metal oxide. Such a fur is wound around or attached to a cored bar having been subjected to a conductive treatment with a metal or the like to be formed into the charger.

The charger is not limited to the contact charger. However, the contact charger is preferred because the amount of by-product ozone is small.

Preferably, the charger is disposed in or out of contact with the image bearer and capable of charging the surface of the image bearer by applying direct-current and alternating-current voltages in superimposition thereto.

Preferably, the charger is a charging roller disposed close to but out of contact with the image bearer via a gap tape and capable of charging the surface of the image bearer by applying direct-current and alternating-current voltages in superimposition thereto.

Irradiator and Irradiation Process

The irradiation process is a process of irradiating the charged surface of the image bearer with light, and is performed by the irradiator. The irradiation process may be performed by irradiating the surface of the image bearer with light containing image information by the irradiator.

The optical system in the irradiator is roughly divided into an analog optical system and a digital optical system.

The analog optical system directly projects an original document onto the surface of the image bearer.

The digital optical system receives image information as an electric signal, converts the electric signal into an optical signal, and irradiates the image bearer with the optical signal to form an image.

The irradiator is not particularly limited and can be suitably selected to suit to a particular application as long as it is capable of irradiating the charged image bearer with light to form an electrostatic latent image. Specific examples thereof include, but are not limited to, various irradiators of radiation optical system type, rod lens array type, laser optical type, liquid crystal shutter optical type, and light emitting diode (LED) optical type.

The irradiation can also be conducted by irradiating the back surface of the image bearer with light containing image information.

Developing Process and Developing Device

The developing process is a process of developing the electrostatic latent image into a toner image, and is performed by the developing device.

The developing device is not particularly limited and can be suitably selected to suit to a particular application as long as it is capable of developing the electrostatic latent image into a toner image. Examples thereof include those containing toner and capable of applying the toner to the electrostatic latent image in a contact or non-contact manner.

The developing device may be of either a dry developing type or a wet developing type. The developing device may be either a monochrome developing device or a multicolor developing device. For example, the developing device may include a stirrer that frictionally stirs and charges the toner and a rotatable magnet roller.

In the developing device, toner particles and carrier particles are mixed and stirred. The toner particles are charged by friction and retained on the surface of the rotating magnet roller, thus forming magnetic brush.

The magnet roller is disposed proximity to the image bearer, so that a part of the toner particles composing the magnetic brush formed on the surface of the magnet roller are moved to the surface of the image bearer by an electric attractive force of the electrostatic latent image. As a result, the electrostatic latent image is developed with the toner to form the toner image on the surface of the image bearer.

The toner contained in the developing device may be a developer containing the toner, and the developer may be either a one-component developer or a two-component developer.

The toner may be either a magnetic toner used as a one-component developer without using a carrier, or a non-magnetic toner.

Transfer Process and Transfer Device

The transfer process is a process of transferring the toner image onto a recording medium, and is performed by the transfer device.

The transfer process preferably includes: a primary transfer process of transferring the toner image onto a surface of an intermediate transferor to form a composite transfer image; and a secondary transfer process of transferring the composite transfer image onto a recording medium.

The transfer device is not particularly limited and can be suitably selected to suit to a particular application as long as it is capable of transferring the toner image onto a recording medium. Preferably, the transfer device includes: a primary transfer device that transfers the toner image onto a surface of an intermediate transferor to form a composite transfer image; and a secondary transfer device that transfers the composite transfer image onto a recording medium.

The primary transfer device and the secondary transfer device each preferably include a transferrer that separates the toner image formed on the image bearer toward the recording medium by charging.

The transferrer is not particularly limited and can be suitably selected to suit to a particular application. Specific examples thereof include, but are not limited to, a corona transferrer utilizing corona discharge, a transfer belt, a transfer roller, a pressure transfer roller, and an adhesive transferrer. The number of the transferrers is at least one, and may be two or more.

The recording medium is not particularly limited and can be suitably selected to suit to a particular application as long as an unfixed toner image can be transferred thereon. Specific examples thereof include, but are not limited to, plain paper and polyethylene terephthalate (PET) sheets for overhead projectors (OHP).

Fixing Process and Fixing Device

The fixing process is a process of fixing the transferred toner image on the recording medium, and is performed by the fixing device. In a case in which toners of two or more colors are used, the toner of each color may be fixed each time the toner is transferred onto the recording medium, or the toners of all colors may be fixed at once after being transferred and stacked on the recording medium.

The fixing device is not particularly limited and can be suitably selected to suit to a particular application as long as it is capable of fixing the transferred toner image on the recording medium. The fixing device may employ a thermal fixing method using a known heat-pressure assembly.

The heat-pressure assembly is not particularly limited and can be suitably selected to suit to a particular application. Specific examples thereof include, but are not limited to, a combination of a heat roller and a pressure roller, and a combination of a heat roller, a pressure roller, and an endless belt.

The heating temperature is not particularly limited and can be suitably selected to suit to a particular application, but is preferably from 80° C. to 200° C. The fixing device may be used together with an optical fixer as necessary.

Cleaning Process and Cleaning Device

The cleaning process is a process of removing the toner remaining on the surface of the image bearer, and is performed by the cleaning device.

The cleaning device includes the cleaning blade according to an embodiment of the present invention.

The linear pressure applied to the surface of the image bearer by the blade substrate of the cleaning blade is not particularly limited and can be suitably selected to suit to a particular application, but is preferably from 10 to 100 N/m, and more preferably from 10 to 50 N/m. When the linear pressure is from 10 to 100 N/m, defective cleaning in which the toner slips through between the contact part and the rotating body is less likely to occur, and the elastic body is prevented from being turned up.

The linear pressure can be measured using, for example, a measuring apparatus incorporating a small compression load cell available from KYOWA ELECTRONIC INSTRUMENTS CO., LTD.

An angle ("cleaning angle") formed between a tangent line of the image bearer at a position that comes into contact with the contact part of the blade substrate of the cleaning blade and the tip surface of the free end of the blade substrate is not particularly limited and can be suitably selected to suit to a particular application, but is preferably from 65° to 85°.

When the cleaning angle is from 65° to 85°, the blade substrate can be prevented from being turned up and the occurrence of defective cleaning can be reduced.

Lubricant Applying Process and Lubricant Applying Device

The lubricant applying process is a process of applying a lubricant to the surface of the image bearer, and is performed by a lubricant applying device.

The application of the lubricant can be performed by molding the lubricant into a solid shape, pressing the solid lubricant against a fur brush using a pressure spring, rotating the fur brush to apply the lubricant to the surface of the image bearer, and then uniformly applying the lubricant using a lubricant leveling blade.

The lubricant applying device contains the lubricant leveling blade of the present embodiment.

The linear pressure applied to the surface of the image bearer by the blade substrate of the lubricant leveling blade is not particularly limited and can be suitably selected to suit to a particular application, but is preferably from 5 to 15 N/m, and more preferably from 5 to 10 N/m. When the linear pressure is from 5 to 15 N/m, the performance of applying the lubricant to the image bearer is stabilized, and the tip edge portion is prevented from being pulled in.

The linear pressure can be measured using, for example, a measuring apparatus incorporating a small compression load cell available from KYOWA ELECTRONIC INSTRUMENTS CO., LTD.

Preferably, the tip edge portion of the lubricant leveling blade has an angle θ of from 90° to 140°. When the angle θ of the tip edge portion is an obtuse angle within the above-described range, the lubricant leveling blade tip surface 104*a* is prevented from being pulled in, and application of the lubricant is stabilized. When the angle θ of the tip edge portion of the lubricant leveling blade is 140° or less, the effect of the edge becomes clear, and the lubricant application function is improved.

Figure 6:
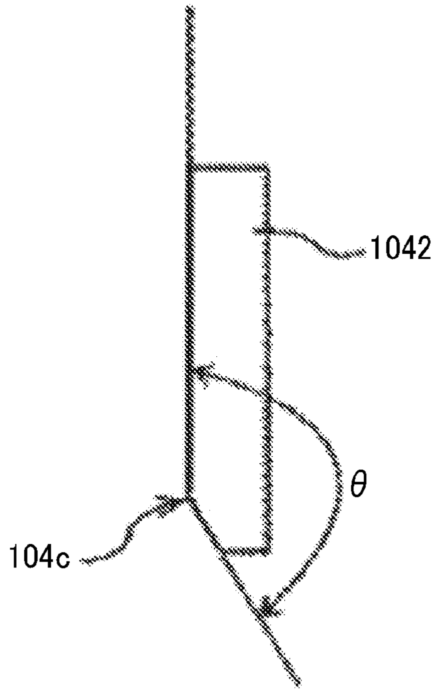
FIG. 6 is a diagram for explaining an angle of a tip edge portion of a lubricant leveling blade according to an embodiment of the present invention.

As illustrated in FIG. 6, the angle θ of the tip edge portion is an angle of a blade corner formed by two surfaces facing the surface of the image bearer on an upstream side and a downstream side, respectively, of the lubricant leveling blade tip edge portion 104*c* in the direction of surface movement of the image bearer.

Other Processes and Other Devices

The other processes may include, for example, a neutralization process, a recycle process, and a control process.

The other devices may include, for example, a neutralizer, a recycler, and a controller.

Neutralization Process and Neutralizer

The neutralization process is a process of applying a neutralization bias voltage to the image bearer to remove charge, and is performed by the neutralizer.

The neutralizer is not particularly limited and can be suitably selected to suit to a particular application as long as it is capable of applying a neutralization bias voltage to the image bearer. Specific examples of the neutralizer include, but are not limited to, a neutralization lamp.

Recycle Process and Recycler

The recycle process is a process of recycling the toner removed in the cleaning process for the developing device, and is performed by the recycler.

The recycler is not particularly limited and can be suitably selected to suit to a particular application. Specific examples thereof include, but are not limited to, a conveyor.

Control Process and Controller

The control process is a process of controlling each of the processes, and is performed by the controller.

The controller is not particularly limited and can be suitably selected to suit to a particular application as long as it is capable of controlling each of the devices. Specific examples thereof include, but are not limited to, a sequencer and a computer.

An image forming apparatus according to an embodiment of the present invention is described below with reference to the drawings. The applications of the cleaning blade are provided herein for the purpose of illustration only and are not intended to be limiting.

In each drawing, the same reference numerals are given to the same components, and redundant explanation may be omitted. The number, position, shape, and the like of the constituent members are not limited to those in the embodiments described below, and can be suitably set to suit to a particular application.

Figure 7:
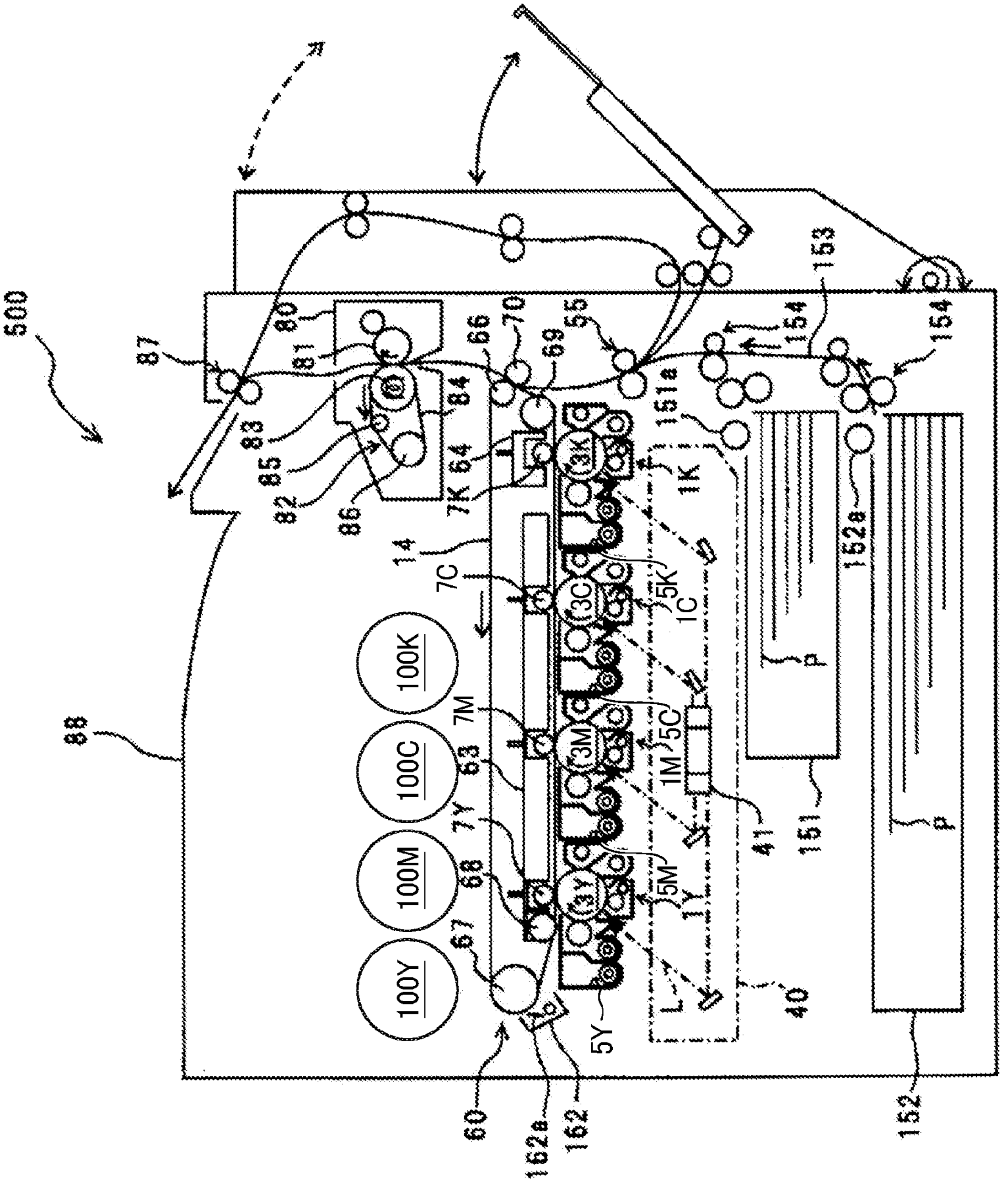
FIG. 7 is a schematic cross-sectional diagram illustrating an image forming apparatus according to an embodiment of the present invention.

FIG. 7 is a schematic diagram illustrating an image forming apparatus 500 according to an embodiment of the present invention. The image forming apparatus 500 includes four image forming units 1Y, 1M, 1C, and 1K for forming yellow, magenta, cyan, and black ("Y, M, C, and K") images, respectively. The image forming units 1Y, 1M, 1C, and 1K have the same configuration except for accommodating different color toners, i.e., yellow, magenta, cyan, and black toners, respectively, as image forming materials.

Above the four image forming units 1Y, 1C, 1M, and 1K (hereinafter collectively "image forming units 1"), a transfer unit 60 is disposed. The transfer unit 60 includes an intermediate transfer belt 14 as an intermediate transferor. The image forming units 1Y, 1M, 1C, and 1K include respective photoconductors 3Y, 3M, 3C, and 3K on which toner images with respective colors are to be formed. The toner images are superimposed on one another on a surface of the intermediate transfer belt 14.

Below the four image forming units 1, an optical writing unit 40 is disposed. The optical writing unit 40, serving as a latent image forming device, emits laser light L based on image information to the photoconductors 3Y, 3M, 3C, and 3K in the respective image forming units 1Y, 1M, 1C, and 1K. Thus, electrostatic latent images for yellow, magenta, cyan, and black images are formed on the respective photoconductors 3Y, 3M, 3C, and 3K. In the optical writing unit 40, the laser light L is emitted from a light source, deflected by a polygon mirror 41 that is rotary-driven by a motor, and directed to the photoconductors 3Y, 3M, 3C, and 3K through multiple optical lenses and mirrors. Alternatively, the optical writing unit 40 can be replaced with another unit in which a light emitting diode (LED) array performs optical scanning.

Below the optical writing unit 40, a first sheet feeding cassette 151 and a second sheet feeding cassette 152 are disposed so as to overlap each other in the vertical direction. In each sheet feeding cassette, multiple recording media P are stacked on top of another. The top one of the recording media P in each sheet feeding cassette is in contact with a first sheet feeding roller 151*a* or a second sheet feeding roller 152*a*. As the first sheet feeding roller 151*a* is rotary-driven counterclockwise in FIG. 7 by a driver, the top one of the recording media P in the first sheet feeding cassette 151 is fed to a sheet feeding path 153 that is vertically extended on a right side of the sheet feeding cassettes in FIG. 7. As the second sheet feeding roller 152*a* is rotary-driven counterclockwise in FIG. 7 by a driver, the top one of the recording media P in the second sheet feeding cassette 152 is fed to the sheet feeding path 153.

On the sheet feeding path 153, multiple conveyance roller pairs 154 are disposed. The recording medium P fed to the sheet feeding path 153 is conveyed upward in FIG. 7 inside the sheet feeding path 153 while being nipped by the rollers of the conveyance roller pairs 154.

On a downstream end of the sheet feeding path 153 relative to the direction of conveyance of the recording medium P, a registration roller pair 55 is disposed. The rollers of the registration roller pair 55 nip the recording medium P fed by the conveyance roller pairs 154 and stop rotating immediately thereafter. The registration roller pair 55 then timely feeds the recording medium P to a secondary transfer nip (to be described later).

Figure 8:
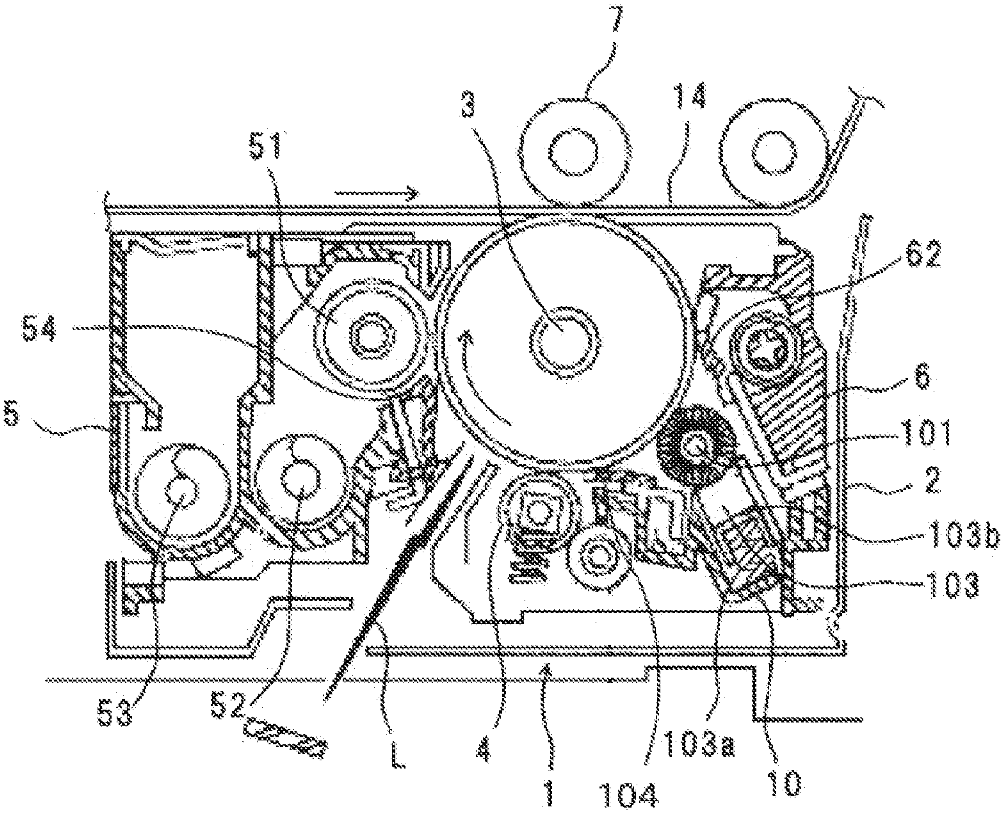
FIG. 8 is a schematic cross-sectional diagram illustrating an image forming unit in the image forming apparatus illustrated in FIG. 7.

FIG. 8 is a schematic diagram illustrating one of the four image forming units 1.

As illustrated in FIG. 8, each of the image forming units 1 includes a drum-shaped photoconductor 3 serving as an image bearer. The photoconductor 3 is in the shape of a drum but may also be in the shape of a sheet or an endless belt.

Around the photoconductor 3, a charging roller 4, a developing device 5, a cleaning device 6, a primary transfer roller 7, a lubricant applying device 10, and a neutralization lamp are disposed. The charging roller 4 is a charging member of the charger. The developing device 5 develops a latent image formed on a surface of the photoconductor 3 into a toner image. The cleaning device 6 removes residual toner particles remaining on the photoconductor 3 after the toner image has been transferred therefrom onto the intermediate transfer belt 14. The primary transfer roller 7 is a primary transfer member of the primary transfer device that transfers the toner image from the surface of the photoconductor 3 onto the intermediate transfer belt 14. The lubricant applying device 10 applies a lubricant to the surface of the photoconductor 3 having been cleaned by the cleaning device 6. The neutralization lamp is the neutralizer that neutralizes the surface potential of the photoconductor 3 having been cleaned.

The charging roller 4 is disposed at a predetermined distance from the photoconductor 3 without contacting the photoconductor 3. The charging roller 4 charges the photoconductor 3 to a predetermined potential with a predetermined polarity. After the charging roller 4 has uniformly charged the surface of the photoconductor 3, the optical writing unit 40 emits the laser light L to the charged surface of the photoconductor 3 based on image information to form an electrostatic latent image.

The developing device 5 includes a developing roller 51 serving as a developer bearer. The developing roller 51 is to be applied with a developing bias from a power source. Within the casing of the developing device 5, a supply screw 52 and a stirring screw 53 are provided for stirring the developer contained in the casing while conveying the developer in opposite directions. Also, a doctor 54 for regulating the developer carried on the developing roller 51 is disposed within the casing. As the developer is stirred and conveyed by the supply screw 52 and the stirring screw 53, toner particles in the developer are charged to have a predetermined polarity. The developer is then carried on the surface of the developing roller 51 and regulated by the doctor 54. Toner particles in the developer adhere to a latent image formed on the photoconductor 3 at a developing region where the developing roller 51 faces the photoconductor 3.

The cleaning device 6 includes a fur brush 101 and the cleaning blade 62. The cleaning blade 62 is in contact with the photoconductor 3 so as to face in the direction of movement of the surface of the photoconductor 3. Details of the cleaning blade 62 are as described above. The lubricant applying device 10 includes a solid lubricant 103, a lubricant pressing spring 103*a*, and the lubricant leveling blade 104. The fur brush 101 serves as an application brush that applies the solid lubricant 103 to the photoconductor 3. The solid lubricant 103 is held by a bracket 103*b* and pressed toward the fur brush 101 by the lubricant pressing spring 103*a*. As the fur brush 101 rotates so as to trail the rotation of the photoconductor 3, the solid lubricant 103 is scraped by the fur brush 101 and the scraped-off lubricant is applied to the photoconductor 3 by the lubricant leveling blade 104. As the lubricant is applied to the photoconductor 3, the coefficient of friction of the surface of the photoconductor 3 is maintained at 0.2 or less during non-image forming periods. The details of the lubricant leveling blade are as described above.

The charger employs a non-contact proximity arrangement system in which the charging roller 4 is disposed in proximity to the photoconductor 3 without contacting the photoconductor 3. Alternatively, any known charger such as a corotron, a scorotron, and a solid state charger can also be used as the charger. Among these charging systems, contact charging systems and non-contact proximity arrangement systems are preferred, since they have advantages in terms of high charging efficiency, less generation of ozone, and compact size.

Examples of the light source of the optical writing unit 40 that emits the laser light L and the light source of the neutralization lamp include all luminous matters such as fluorescent lamp, tungsten lamp, halogen lamp, mercury lamp, sodium-vapor lamp, light-emitting diode (LED), laser diode (LD), and electroluminescence (EL).

For the purpose of emitting only light having a desired wavelength, any type of filter can be used, such as sharp cut filter, band pass filter, near infrared cut filter, dichroic filter, interference filter, and color-temperature conversion filter.

Among these light sources, light-emitting diode and semiconductor laser are preferred since they can emit long-wavelength light (600-800 nm) with high energy.

Referring to FIG. 7, the transfer unit 60 serving as the transfer device further includes, in addition to the intermediate transfer belt 14, a belt cleaning unit 162, a first bracket 63, and a second bracket 64. The transfer unit 60 further includes four primary transfer rollers 7Y, 7M, 7C, and 7K, a secondary transfer backup roller 66, a driving roller 67, an auxiliary roller 68, and a tension roller 69. The intermediate transfer belt 14 is stretched taut with these eight rollers and is rotary-driven by the driving roller 67 to endlessly move counterclockwise in FIG. 7. The four primary transfer rollers 7Y, 7M, 7C, and 7K and the respective photoconductors 3Y, 3M, 3C, and 3K are sandwiching the intermediate transfer belt 14 that is endlessly moved, forming respective primary transfer nips therebetween. The back surface (i.e., inner circumferential surface of the loop) of the intermediate transfer belt 14 is then applied with a transfer bias having the opposite polarity to the toner (e.g., positive polarity). As the intermediate transfer belt 14 endlessly moves while sequentially passing the primary transfer nips of yellow, magenta, cyan, and black, the toner images of yellow, magenta, cyan, and black formed on the respective photoconductors 3Y, 3M, 3C, and 3K are superimposed on one another on the outer circumferential surface of the intermediate transfer belt 14. Thus, a composite toner image in which four color toner images are superimposed on one another is formed on the intermediate transfer belt 14.

The secondary transfer backup roller 66 and a secondary transfer roller 70, disposed outside the loop of the intermediate transfer belt 14, are sandwiching the intermediate transfer belt 14 to form a secondary transfer nip therebetween. The above-described registration roller pair 55 feeds the recording medium P to the secondary transfer nip in synchronization with an entry of the composite toner image on the intermediate transfer belt 14 into the secondary transfer nip. The composite toner image on the intermediate transfer belt 14 is secondarily transferred onto the recording medium P in the secondary transfer nip by the actions of a secondary transfer electric field and the nip pressure. The secondary transfer electric field is formed between the secondary transfer roller 70 to which a secondary transfer bias is applied and the secondary transfer backup roller 66. The composite toner image is combined with the white color of the recording medium P to become a full-color toner image.

On the intermediate transfer belt 14 having passed through the secondary transfer nip, residual toner particles that have not been transferred onto the recording medium P are remaining. These residual toner particles are removed by the belt cleaning unit 162. The belt cleaning unit 162 includes a belt cleaning blade 162*a* in contact with the outer circumferential surface of the intermediate transfer belt 14. The belt cleaning blade 162*a* scrapes off the residual toner particles from the intermediate transfer belt 14.

The first bracket 63 of the transfer unit 60 is swingable about the rotation axis of the auxiliary roller 68 at a predetermined angle in accordance with on/off driving operation of a solenoid. When the image forming apparatus 500 is to form a black-and-white image, the first bracket 63 is slightly rotated counterclockwise in FIG. 7 by driving the solenoid. This rotation of the first bracket 63 makes the primary transfer rollers 7Y, 7M, and 7C revolve counterclockwise in FIG. 7 about the rotation axis of the auxiliary roller 68 to bring the intermediate transfer belt 14 away from the photoconductors 3Y, 3M, and 3C. Thus, among the four image forming units 1Y, 1M, 1C, and 1K, only the image forming unit 1K for black image is brought into operation to form a black-and-white image. Since unnecessary driving of the image forming units 1Y, 1M, and 1C is avoid during formation of the black-and-white image, undesired deterioration of compositional members of the image forming units 1Y, 1M, and 1C can be prevented.

Above the secondary transfer nip in FIG. 7, a fixing unit 80 is disposed. The fixing unit 80 includes a pressure heating roller 81 and a fixing belt unit 82. The pressure heating roller 81 contains a heat source, such as a halogen lamp, inside. The fixing belt unit 82 includes a fixing belt 84 serving as a fixing member, a heating roller 83 containing a heat source (e.g., halogen lamp) inside, a tension roller 85, a driving roller 86, and a temperature sensor. The fixing belt 84 in an endless-belt form is stretched taut with the heating roller 83, the tension roller 85, and the driving roller 86, and is endlessly moved counterclockwise in FIG. 7. The fixing belt 84 is heated from its back surface side by the heating roller 83 while endlessly moving. At a position where the fixing belt 84 is wound around the heating roller 83, the pressure heating roller 81 is contacting the outer circumferential surface of the fixing belt 84. The pressure heating roller 81 is driven to rotate clockwise in FIG. 7. Thus, the pressure heating roller 81 and the fixing belt 84 form a fixing nip therebetween.

The temperature sensor is disposed outside the loop of the fixing belt 84 facing the outer circumferential surface of the fixing belt 84 forming a predetermined gap therebetween. The temperature sensor detects the surface temperature of the fixing belt 84 immediately before entering into the fixing nip. The detection result is transmitted to a fixing power supply circuit. The fixing power supply circuit on/off controls power supply to the heat sources contained in the heating roller 83 and the pressure heating roller 81 based on the detection result.

The recording medium P having passed though the secondary transfer nip is then separated from the intermediate transfer belt 14 and fed to the fixing unit 80. The recording medium P is fed upward in FIG. 7 while being sandwiched by the fixing nip in the fixing unit 80. During this process, the recording medium P is heated and pressurized by the fixing belt 84, and the full-color toner image is fixed on the recording medium P.

The recording medium P having the fixed image thereon is passed through an ejection roller pair 87 and ejected outside the image forming apparatus 500. On the top surface of the housing of the image forming apparatus 500, a stack part 88 is formed. The recording media P ejected by the ejection roller pair 87 are successively stacked on the stack part 88.

Above the transfer unit 60, four toner cartridges 100Y, 100M, 100C, and 100K accommodating yellow toner, magenta toner, cyan toner, and black toner, respectively, are disposed. The yellow, magenta, cyan, and black toners accommodated in the respective toner cartridges 100Y. 100M. 100C, and 100K are supplied to the respective developing devices 5Y, 5M, 5C, and 5K in the respective image forming units 1Y, 1M, 1C, and 1K. The toner cartridges 100Y, 100M, 100C, and 100K are detachably mountable on the image forming apparatus main body independent from the image forming units 1Y, 1M, 1C, and 1K.

Next, an image forming operation of the image forming apparatus 500 is described below. In response to receipt of a print execution signal from an operation panel, the charging roller 4 and the developing roller 51 each get applied with a predetermined voltage or current at a predetermined timing. Similarly, the light sources in the optical writing unit 40 and the neutralization lamp each get applied with a predetermined voltage or current at a predetermined timing. In synchronization with the application of voltage or current, the photoconductor 3 is driven to rotate in a direction indicated by arrow in FIG. 7 by a photoconductor driving motor.

As the photoconductor 3 rotates in a direction indicated by arrow in FIG. 7, the surface of the photoconductor 3 is uniformly charged to a predetermined potential by the charging roller 4. The optical writing unit 40 emits the laser light L to the charged surface of the photoconductor 3 based on image information. A part of the surface of the photoconductor 3 irradiated with the laser light L is neutralized, thereby forming an electrostatic latent image. The surface of the photoconductor 3 having the electrostatic latent image thereon is rubbed by a magnetic brush formed of the developer on the developing roller 51 at a position where the photoconductor 3 is facing the developing device 5. As a developing bias is applied to the developing roller 51, negatively-charged toner particles on the developing roller 51 are transferred onto the electrostatic latent image, thus forming a toner image. This image forming process is performed in each of the image forming units 1Y, 1M, 1C, and 1K to form yellow, magenta, cyan, and black toner images on the photoconductors 3Y, 3M, 3C, and 3K, respectively.

Thus, in the image forming apparatus 500, the developing device 5 develops the electrostatic latent image formed on the photoconductor 3 with negatively-charged toner particles based on reversal development. In the present embodiment, an N/P (i.e., negative/positive) development system (in which toner particles get adhered to low-potential regions) and a non-contact charging roller are employed, but the development and charging systems are not limited thereto.

The toner images formed on the photoconductors 3Y, 3M, 3C, and 3K are primarily transferred onto the surface of the intermediate transfer belt 14 in a sequential manner so that they get superimposed on one another on the surface of the intermediate transfer belt 14.

Thus, a composite toner image is formed on the intermediate transfer belt 14.

The composite toner image ("toner image" for simplicity) formed on the intermediate transfer belt 14 is transferred onto the recording medium P which has been fed from the first sheet feeding cassette 151 or second sheet feeding cassette 152, passed through the registration roller pair 55, and fed to the secondary transfer nip. The recording medium P is once stopped by being sandwiched by the registration roller pair 55, and then fed to the secondary transfer nip in synchronization with an entry of the leading end of the toner image on the intermediate transfer belt 14 into the secondary transfer nip. The recording medium P having the transferred toner image thereon is then separated from the intermediate transfer belt 14 and fed to the fixing unit 80. As the recording medium P having the transferred toner image thereon passes through the fixing unit 80, the toner image is fixed on the transfer sheet P by heat and pressure. The transfer sheet P having the fixed toner image thereon is ejected outside the image forming apparatus 500 and stacked at the stack part 88.

On the other hand, after the toner image has been transferred from the surface of the intermediate transfer belt 14 onto the recording medium P in the secondary transfer nip, the belt cleaning unit 162 removes residual toner particles remaining on the surface of the intermediate transfer belt 14.

Similarly, after the toner image has been transferred from the surface of the photoconductor 3 onto the intermediate transfer belt 14 in the primary transfer nip, the cleaning device 6 removes residual toner particles remaining on the surface of the photoconductor 3. The lubricant applying device 10 then applies a lubricant to the cleaned surface, and the neutralization lamp further neutralizes the surface.

As illustrated in FIG. 8, each of the image forming units 1 of the image forming apparatus 500 has a frame body 2 accommodating the photoconductor 3 and the processing devices including the charging roller 4, the developing device 5, the cleaning device 6, and the lubricant applying device 10. The image forming units 1 is temporarily detachable from the main body of the image forming apparatus 500 as a process cartridge. Thus, in the image forming apparatus 500, the photoconductor 3 and the processing devices are replaceable at the same time by replacing each of the image forming units 1 as the process cartridge. Alternatively, each of the photoconductor 3, the charging roller 4, the developing device 5, the cleaning device 6, and the lubricant applying device 10 may be independently replaceable.

Process Cartridge

A process cartridge of the present embodiment includes: an image bearer; at least one of a charger, an irradiator, a developing device, and a transfer device; and a cleaning device that comes into contact with the surface of the image bearer to remove a residue on the surface of the image bearer. The process cartridge may further include other devices such as a lubricant applying device that comes into contact with the surface of the image bearer to apply a lubricant to the surface of the image bearer.

The cleaning device includes the cleaning blade according to an embodiment of the present invention.

The lubricant applying device includes the lubricant leveling blade according to an embodiment of the present invention.

The process cartridge is a device (part) that is detachably mountable on an image forming apparatus, which contains: an image bearer; at least one of a charger, an irradiator, a developing device, and a transfer device; and a cleaning device, and optionally a lubricant applying device.

EXAMPLES

Hereinafter, the present invention will be further described by way of examples and reference examples, but the present invention is not limited to the following examples. In the following descriptions, "parts" represents "parts by mass" unless otherwise specified.

Example 1

Preparation of Blade Substrate of Cleaning Blade

Polyurethane elastomer sheets obtained through the processes of centrifugal molding, curing, and post-crosslinking were respectively used for the edge layer and the base layer. The average thickness and Martens hardness (HM) of the edge layer and the base layer are as follows.

Average thickness: 2.0 [mm]

Martens hardness (HM) of edge layer: 0.5 [$N/mm^2$]

Martens hardness (HM) of base layer: 2.0 [$N/mm^2$]

The edge layer and the base layer were bonded to each other to prepare a blade substrate. The blade substrate was bonded to a metal plate.

Preparation of Coating Layer

Preparation of Particle Dispersion A

In a screw tube, 6 parts of a polytetrafluoroethylene (PTFE) micropowder (TF9201Z, product of 3M Company, having a volume average particle diameter of 200 nm) as the first fluorine-based resin, 2 parts of a VdF-HFP-TFE terpolymer composed of vinylidene fluoride (VdF), hexafluoropropylene (HFP), and tetrafluoroethylene (TFE) as the second fluorine-based resin, and 92 parts of 1,1,2,2-tetrafluoroethyl 2,2,2-trifluoroethyl ether (HFE-347, product of Tokyo Chemical Industry Co., Ltd.) as a fluorine-based dispersion medium were put and stirred using a stirrer. Thus, a particle dispersion A was prepared.

Preparation of Particle Dispersion B

In a screw tube, 6 parts of a polytetrafluoroethylene (PTFE) micropowder (TF9201Z, product of 3M Company, having a volume average particle diameter of 200 nm) as the first fluorine-based resin, 2 parts of polyvinylidene fluoride (PVdF) as the second fluorine-based resin, and 92 parts of 1,1,2,2-tetrafluoroethyl 2,2,2-trifluoroethyl ether (HFE-347, product of Tokyo Chemical Industry Co., Ltd.) as a fluorine-based dispersion medium were put and stirred using a stirrer. Thus, a particle dispersion B was prepared.

Preparation of Particle Dispersion C

In a screw tube, 6 parts of a polytetrafluoroethylene (PTFE) micropowder (TF9201Z, product of 3M Company, having a volume average particle diameter of 200 nm) as the first fluorine-based resin, 2 parts of a VdF-HFP copolymer composed of vinylidene fluoride (VdF) and hexafluoropropylene (HFP) as the second fluorine-based resin, and 92 parts of 1,1,2,2-tetrafluoroethyl 2,2,2-trifluoroethyl ether (HFE-347, product of Tokyo Chemical Industry Co., Ltd.) as a fluorine-based dispersion medium were put and stirred using a stirrer. Thus, a particle dispersion C was prepared.

Preparation of Particle Dispersion D

In a screw tube, 95 parts of an aqueous dispersion of polymethyl methacrylate (PMMA) (MX100W, product of NIPPON SHOKUBAI CO., LTD., having a volume average particle diameter of 150 nm) and 5 parts of polyvinyl butyral (PVB) (S-LEC KW-M, product of SEKISUI CHEMICAL CO., LTD., having a degree of acetalization of 24±3 mol %) as the second fluorine-based resin were stirred using a stirrer. Thus, a particle dispersion D was prepared.

Dipping

Figure 9:
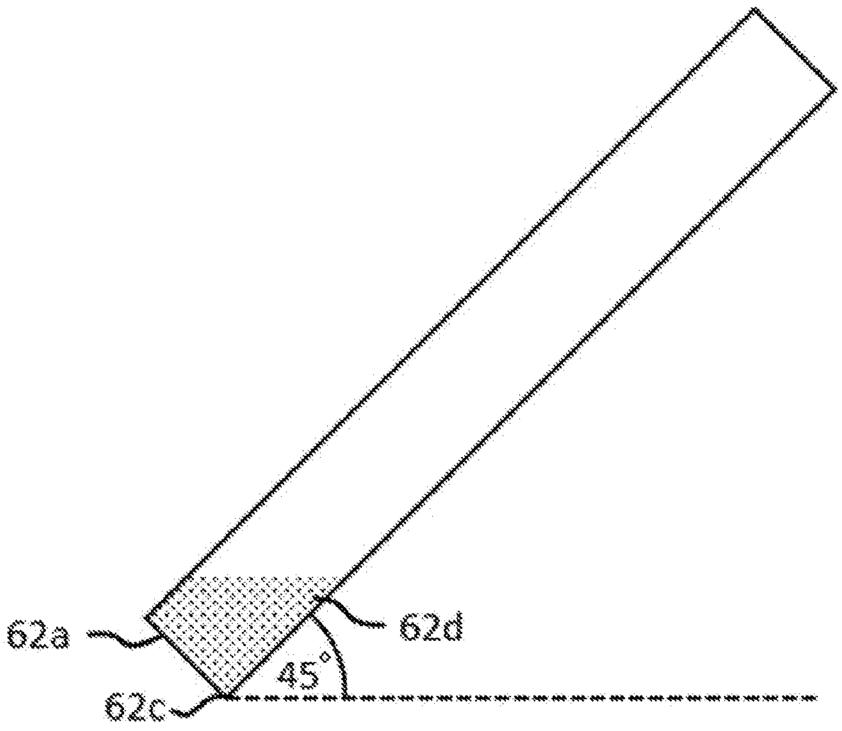
FIG. 9 is a diagram illustrating a method of forming a coating layer according to an embodiment of the present invention.

One end surface of the peripheral side surfaces of the cleaning blade (hereinafter, may be referred to as a "cleaning blade tip surface") was dipped in the particle dispersion A at a right angle to a horizontal plane by a depth of 2 mm from the cleaning blade tip surface, and pulled up at a pulling rate of 1 mm/s. For the purpose of collecting the PTFE particles that impart the cleaning function in a portion including the contact edge of the cleaning blade tip surface, the cleaning blade was tilted by about 45°, as illustrated in FIG. 9, and dried at room temperature (25° C.) for 30 minutes. Thus, a cleaning blade of Example 1 was prepared.

Examples 2 to 9

Cleaning blades of Examples 2 to 9 were prepared in the same manner as in Example 1 except that the Martens hardness of the edge layer, the Martens hardness of the base layer, and the average thickness of the coating layer in the cleaning blades were changed as presented in Tables 1 to 3.

Examples 10 to 12 and Comparative Examples 1 to 7

Cleaning blades of Examples 10 to 12 and Comparative Examples 1 to 7 were prepared in the same manner as in Example 1 except that the first fluorine-based resin, the second fluorine-based resin, the dispersion medium, the Martens hardness of the edge layer, the Martens hardness of the base layer, and the average thickness of the coating layer in the cleaning blades were changed as presented in Tables 1 to 3.

In Example 10, Example 11, and Comparative Example 2, the particle dispersion B, the particle dispersion C, and the particle dispersion D were used, respectively.

The cleaning blade of Comparative Example 1 includes a blade substrate provided with no coating layer.

Assembly of Image Forming Apparatus

Each of the cleaning blades obtained in Examples 1 to 12 and Comparative Examples 1 to 7 was mounted on a process cartridge of a color multifunction peripheral (IMAGIO MP C4500, product of Ricoh Co., Ltd.), the printer part of which having the same configuration as the image forming apparatus 500 illustrated in FIG. 7, to assemble an image forming apparatus. The cleaning blade was mounted on the image forming apparatus so as to exhibit a linear pressure of 20 g/cm and a cleaning angle of 79°.

Measurement of Martens Hardness

The Martens hardness of the edge layer and the Martens hardness of the base layer of each of the cleaning blades obtained in Examples 1 to 12 and Comparative Examples 1 to 7 were measured.

The Martens hardness (HM) can be measured according to ISO 14577 using a nanoindenter (ENT-3100, product of ELIONIX INC.) by pushing a Berkovich indenter into a sample with a load of 1,000 μN for 10 seconds, holding for 5 seconds, and pulling the indenter with the same loading rate for 10 seconds. The results are presented in Tables 1 to 3.

The Martens hardness of the edge layer was measured at a position 20 μm distant from the tip edge portion of the edge layer. The Martens hardness of the base layer was measured at a position 20 μm distant from the tip edge portion of the base layer.

The Martens hardness is the median of the values measured at 4 to 6 positions.

Measurement of Average Thickness of Coating Layer

The average thickness of the coating layer of each of the cleaning blades obtained in Examples 1 to 12 and Comparative Examples 1 to 7 was measured. The results are presented in Tables 1 to 3.

The average thickness was measured by scraping off a part of the coating layer with a spatula, a cotton swab, or the like and measuring the shape thereof using a contact surface roughness meter (SURFTEST SJ-500, product of Mitutoyo Corporation).

TABLE 1

| | | | | Examples | | | | | |
|---|---|---|---|---|---|---|---|---|---|
| | | | | 1 | 2 | 3 | 4 | 5 | 6 |
| Cleaning Blade | Coating Layer | First Fluorine-Based Resin | PTFE (Particle Diameter: 0.230 [μm]) | 6.0 | 6.0 | 6.0 | 6.0 | 6.0 | 6.0 |
| | | | PMMA (Particle Diameter: 0.150 [μm]) | — | — | — | — | — | — |
| | | Second Fluorine-Based Resin | Vdf | — | — | — | — | — | — |
| | | | Vdf/HFP | — | — | — | — | — | — |
| | | | Vdf/HFP/TFE | 2.0 | 2.0 | 2.0 | 2.0 | 2.0 | 2.0 |
| | | Dispersion Medium | 1,1,2,2-Tetrafluoroethyl 2,2,2-trifluoroethyl ether | 92.0 | 92.0 | 92.0 | 92.0 | 92.0 | 92.0 |
| | | | PVB | — | — | — | — | — | — |
| | | Average thickness [μm] | | 2.0 | 1.0 | 3.0 | 2.0 | 5.0 | 0.5 |
| | Martens Hardness of Edge Layer [N/mm$^2$] | | | 0.5 | 0.5 | 1.0 | 2.0 | 2.0 | 0.5 |
| | Martens Hardness of Base Layer [N/mm$^2$] | | | 2.0 | 2.0 | 1.5 | 0.5 | 0.5 | 2.0 |
| Evaluation | Torque Increase Rate | | | A | B | A | A | A | B |
| | Cleaning Performance | | | A | A | A | A | A | B |

TABLE 2

| | | | | Examples | | | | | |
|---|---|---|---|---|---|---|---|---|---|
| | | | | 7 | 8 | 9 | 10 | 11 | 12 |
| Cleaning Blade | Coating Layer | First Fluorine-Based Resin | PTFE (Particle Diameter: 0.230 [μm]) | 6.0 | 6.0 | 6.0 | 6.0 | 6.0 | 4.5 |
| | | | PMMA (Particle Diameter: 0.150 [μm]) | — | — | — | — | — | — |
| | | Second Fluorine-Based Resin | Vdf | — | — | — | 2.0 | — | — |
| | | | Vdf/HFP | — | — | — | — | 2.0 | — |
| | | | Vdf/HFP/TFE | 2.0 | 2.0 | 2.0 | — | — | 3.5 |
| | | Dispersion Medium | 1,1,2,2-Tetrafluoroethyl 2,2,2-trifluoroethyl ether | 92.0 | 92.0 | 92.0 | 92.0 | 92.0 | 92.0 |
| | | | PVB | — | — | — | — | — | — |
| | | Average thickness [μm] | | 25.0 | 12.5 | 1.0 | 3.0 | 3.0 | 2.0 |
| | Martens Hardness of Edge Layer [N/mm$^2$] | | | 0.5 | 2.0 | 0.5 | 1.0 | 1.0 | 3.0 |
| | Martens Hardness of Base Layer [N/mm$^2$] | | | 2.0 | 1.5 | 1.5 | 1.5 | 1.5 | 2.0 |
| Evaluation | Torque Increase Rate | | | B | B | B | B | A | B |
| | Cleaning Performance | | | B | B | B | B | B | B |

TABLE 3

| | | | | Comparative Examples | | | | | | |
|---|---|---|---|---|---|---|---|---|---|---|
| | | | | 1 | 2 | 3 | 4 | 5 | 6 | 7 |
| Cleaning Blade | Coating Layer | First Fluorine-Based Resin | PTFE (Particle Diameter: 0.230 [μm]) | — | — | — | 8.0 | 6.0 | 4.0 | — |
| | | | PMMA (Particle Diameter: 0.150 [μm]) | | 95.0 | | — | — | — | 5 |
| | | Second Fluorine- | Vdf | — | — | — | — | 2.0 | 4.0 | 2.0 |
| | | | Vdf/HFP | | | — | | — | — | — |

TABLE 3-continued

| | | | Comparative Examples | | | | | | |
|---|---|---|---|---|---|---|---|---|---|
| | | | 1 | 2 | 3 | 4 | 5 | 6 | 7 |
| | Based Resin | Vdf/HFP/TFE | | | 8.0 | | — | — | — |
| | Dispersion Medium | 1,1,2,2-Tetrafluoroethyl 2,2,2-trifluoroethyl ether | — | — | 92.0 | 92.0 | 92.0 | 92.0 | 93.0 |
| | | PVB | — | 5.0 | — | — | — | — | — |
| | Average thickness [μm] | | — | 2.0 | 2.0 | 1.0 | 5.0 | 5.0 | 8.0 |
| | Martens Hardness of Edge Layer [N/mm$^2$] | | 0.5 | 0.5 | 1.5 | 0.5 | 0.45 | 3.1 | 2.0 |
| | Martens Hardness of Base Layer [N/mm$^2$] | | 2.0 | 2.0 | 2.0 | 2.0 | 1.5 | 1.5 | 2.0 |
| Evaluation | Torque Increase Rate | | C | C | C | C | C | B | C |
| | Cleaning Performance | | B | B | B | B | C | C | C |

Evaluation of Torque Increase Rate

The above-prepared imaging apparatus was made to produce output under the following conditions to measure the rate of change in the driving torque increase of the photoconductor. After the output, the tip portion of the cleaning blade was observed with a laser microscope (LEXT OLS4500, product of Olympus Corporation), and the torque increase rate was evaluated based on the following criteria. The evaluation results are presented in Tables 1 to 3. The "initial value" defined in the evaluation criteria refers to the value obtained in the initial stage in which the 1st to 500th sheets were output.

Environment: 23° C./45% RH

Output condition: White sheet chart

Number of output sheets: 5,000 sheets (A4-size lateral)

Evaluation Criteria

A: The rate of change in torque increase was within 50% of the initial value, and the photoconductor did not stop due to an increase in driving torque. The tip portion of the cleaning blade was observed to have no trace of turning-up even after the output.

B: The rate of change in torque increase was within 50% of the initial value, and the photoconductor did not stop due to an increase in driving torque. The tip portion of the cleaning blade was observed to have a trace of turning-up after the output, but it was not at such a level that the cleaning blade allowed the toner to pass through. No problem in practical use.

C: The photoconductor stopped due to an increase in torque. The tip portion of the cleaning blade was observed to have a trace of turning-up after the output to such an extent that the toner passed through the cleaning blade. Not suitable for practical use.

Evaluation of Image Quality (Cleaning Performance)

The above-prepared image forming apparatus was made to produce output under the following conditions. After that, the tip portion of the cleaning blade and the surface of the photoconductor were observed with a laser microscope (LEXT OLS4500, product of Olympus Corporation) and evaluated based on the following criteria. The evaluation results are presented in Tables 1 to 3.

Environment: 27° C./80% RH

Output condition: 3 prints/job of a chart having an image area ratio of 5%

Number of output sheets: 50,000 sheets (A4-size lateral)

Evaluation Criteria

A: Toner particles having slipped through due to defective cleaning are not visually confirmed on either the print sheet or the photoconductor, and no streak-like toner slippage is confirmed even when the photoconductor is observed with a microscope in the longitudinal direction.

B: Toner particles having slipped through due to defective cleaning are not visually confirmed on either the print sheet or the photoconductor, but streak-like toner slippage is confirmed when the photoconductor is observed with a microscope in the longitudinal direction.

C: Toner particles having slipped through due to defective cleaning are visually confirmed on either the print sheet or the photoconductor.

Reference Example 1

Preparation of Lubricant Leveling Blade

A lubricant leveling blade of Reference Example 1 was prepared in the same manner as in Example 1 except that the average thickness was changed to 1.4 mm.

Lubricant leveling blades of Reference Examples 2 to 10 were prepared in the same manner as in Reference Example 1 except that the Martens hardness of the edge layer, the Martens hardness of the base layer, and the average thickness of the coating layer in the lubricant leveling blades were changed as presented in Tables 4 to 6.

Reference Examples 11 and 12 and Reference Comparative Examples 1 to 6

Lubricant leveling blades of Reference Examples 11 and 12 and Reference Comparative Examples 1 to 6 were prepared in the same manner as in Reference Example 1 except that the first fluorine-based resin, the second fluorine-based resin, the dispersion medium, the Martens hardness of the edge layer, the Martens hardness of the base layer, and the average thickness of the coating layer in the lubricant leveling blades were changed as presented in Tables 4 to 6.

In Reference Example 11, Reference Example 12, and Reference Comparative Example 2, the particle dispersion B, the particle dispersion C, and the particle dispersion D were used, respectively.

The lubricant leveling blade of Reference Comparative Example 1 includes a blade substrate provided with no coating layer.

Assembly of Image Forming Apparatus

An image forming apparatus was assembled in the same manner as in Examples 1 to 12 and Comparative Examples 1 to 7. Each of the lubricant leveling blades of Reference Examples 1 to 12 and Reference Comparative Examples 1 to 6 was attached to the image forming apparatus so as to exhibit a linear pressure of 10 g/cm and an angle θ of the tip edge portion of from 90° to 140°.

Measurement of Martens Hardness

The Martens hardness of the edge layer and the Martens hardness of the base layer of the lubricant leveling blades obtained in Reference Examples 1 to 12 and Reference Comparative Examples 1 to 6 were measured in the same manner as in Examples 1 to 12 and Comparative Examples 1 to 7. The results are presented in Tables 4 to 6.

Measurement of Average Thickness of Coating Layer

The average thickness of the coating layer of each of the lubricant leveling blades obtained in Reference Examples 1 to 12 and Reference Comparative Examples 1 to 6 was measured in the same manner as in Examples 1 to 12 and Comparative Examples 1 to 7. The results are presented in Tables 4 to 6.

TABLE 4

| | | | | Reference Examples | | | | | |
|---|---|---|---|---|---|---|---|---|---|
| | | | | 1 | 2 | 3 | 4 | 5 | 6 |
| Lubricant Leveling Blade | Coating Layer | First Fluorine-Based Resin | PTFE (Particle Diameter: 0.230 [μm]) | 6.0 | 6.0 | 6.0 | 6.0 | 6.0 | 6.0 |
| | | | PMMA (Particle Diameter: 0.150 [μm]) | — | — | — | — | — | — |
| | | Second Fluorine-Based Resin | Vdf | — | — | — | — | — | — |
| | | | Vdf/HFP | — | — | — | — | — | — |
| | | | Vdf/HFP/TFE | 2.0 | 2.0 | 2.0 | 2.0 | 2.0 | 2.0 |
| | | Dispersion Medium | 1,1,2,2-Tetrafluoroethyl 2,2,2-trifluoroethyl ether | 92.0 | 92.0 | 92.0 | 92.0 | 92.0 | 92.0 |
| | | | PVB | — | — | — | — | — | — |
| | | Average thickness [μm] | | 1.4 | 2.0 | 2.0 | 3.0 | 2.0 | 2.0 |
| | Martens Hardness of Edge Layer [$N/mm^2$] | | | 0.5 | 0.5 | 3.0 | 3.0 | 2.0 | 2.0 |
| | Martens Hardness of Base Layer [$N/mm^2$] | | | 2.0 | 2.0 | 2.0 | 2.0 | 0.5 | 0.5 |
| | Angle of Tip Edge Portion [°] | | | 90 | 125 | 90 | 125 | 125 | 125 |
| Evaluation | Lubricant Application Performance | | | B | A | A | A | A | A |

TABLE 5

| | | | | Reference Examples | | | | | |
|---|---|---|---|---|---|---|---|---|---|
| | | | | 7 | 8 | 9 | 10 | 11 | 12 |
| Lubricant Leveling Blade | Coating Layer | First Fluorine-Based Resin | PTFE (Particle Diameter: 0.230 [μm]) | 6.0 | 6.0 | 6.0 | 6.0 | 6.0 | 6.0 |
| | | | PMMA (Particle Diameter: 0.150 [μm]) | — | — | — | — | — | — |
| | | Second Fluorine-Based Resin | Vdf | — | — | — | — | 2.0 | — |
| | | | Vdf/HFP | — | — | — | — | — | 2.0 |
| | | | Vdf/HFP/TFE | 2.0 | 2.0 | 2.0 | 2.0 | — | — |
| | | Dispersion Medium | 1,1,2,2-Tetrafluoroethyl 2,2,2-trifluoroethyl ether | 92.0 | 92.0 | 92.0 | 92.0 | 92.0 | 92.0 |
| | | | PVB | — | — | — | — | — | — |
| | | Average thickness [μm] | | 0.5 | 25.0 | 12.5 | 1.0 | 3.0 | 3.0 |
| | Martens Hardness of Edge Layer [$N/mm^2$] | | | 0.5 | 0.5 | 2.0 | 0.5 | 1.0 | 1.0 |
| | Martens Hardness of Base Layer [$N/mm^2$] | | | 2.0 | 2.0 | 1.5 | 1.5 | 1.5 | 1.5 |
| | Angle of Tip Edge Portion [°] | | | 140 | 90 | 90 | 140 | 125 | 125 |
| Evaluation | Lubricant Application Performance | | | B | B | B | B | B | B |

TABLE 6

| | | | | Reference Comparative Examples | | | | | |
|---|---|---|---|---|---|---|---|---|---|
| | | | | 1 | 2 | 3 | 4 | 5 | 6 |
| Lubricant Leveling Blade | Coating Layer | First Fluorine-Based Resin | PTFE (Particle Diameter: 0.230 [μm]) | — | — | — | 8.0 | 6.0 | 6.0 |
| | | | PMMA (Particle Diameter: 0.150 [μm]) | | 95.0 | — | — | — | — |
| | | Second Fluorine-Based Resin | Vdf | — | — | — | — | — | — |
| | | | Vdf/HFP | | | — | | — | — |
| | | | Vdf/HFP/TFE | | | 8.0 | | 2.0 | 2.0 |
| | | Dispersion Medium | 1,1,2,2-Tetrafluoroethyl 2,2,2-trifluoroethyl ether | — | — | 92.0 | 92.0 | 92.0 | 92.0 |
| | | | PVB | — | 5.0 | — | — | — | — |
| | | Average thickness [μm] | | — | 2.0 | 2.0 | 1.0 | 5.0 | 5.0 |

TABLE 6-continued

| | | Reference Comparative Examples | | | | | |
|---|---|---|---|---|---|---|---|
| | | 1 | 2 | 3 | 4 | 5 | 6 |
| | Martens Hardness of Edge Layer [N/mm$^2$] | 0.5 | 0.5 | 1.5 | 1.0 | 0.45 | 3.5 |
| | Martens Hardness of Base Layer [N/mm$^2$] | 2.0 | 2.0 | 2.0 | 2.0 | 1.5 | 1.5 |
| | Angle of Tip Edge Portion [°] | 90 | 90 | 90 | 90 | 90 | 90 |
| Evaluation | Lubricant Application Performance | C | C | C | C | C | C |

Evaluation of Image Quality (Lubricant Application Performance)

The above-prepared image forming apparatuses including the respective lubricant leveling blades obtained in Reference Examples 1 to 12 and Reference Comparative Examples 1 to 6 were made to produce output under the following conditions. After that, a halftone image was output, and the degree of unevenness in the longitudinal direction of the photoconductor was evaluated. It is known that the more uniformly the lubricant is applied in the longitudinal direction of the photoconductor, the less the unevenness on the image.

Environment: 23° C./50% RH

Output condition: Continuously outputting a chart having an image area ratio of 0% (i.e., white sheet)

Number of output sheets: 200,000 sheets (A4-size lateral)

Evaluation Criteria

A: The halftone image has no or almost no unevenness.

B: The halftone image partially has unevenness. No problem in practical use.

C: The entire halftone image has unevenness. Not suitable for practical use.

Embodiments of the present invention include the following items (1) to (15).

(1) A cleaning blade for cleaning a rotating body, the cleaning blade comprising:

an edge layer having a tip portion that comes into contact with the rotating body; and a coating layer on the tip portion of the edge layer, wherein the coating layer contains a first fluorine-based resin and a second fluorine-based resin incompatible with the first fluorine-based resin, wherein the cleaning blade has a Martens hardness of from 0.5 to 3 N/mm$^2$ at a position 20 μm distant from a tip edge portion of the edge layer.

(2) The cleaning blade according to above (1), wherein the cleaning blade has a Martens hardness of from 0.5 to 2 N/mm$^2$ at the position 20 μm distant from the tip edge portion of the edge layer.

(3) The cleaning blade according to above (1) or (2), wherein the cleaning blade has an average thickness of from 2.0 to 10.0 μm at the position 20 μm distant from the tip edge portion of the edge layer.

(4) The cleaning blade according to any one of above (1) to (3), wherein the first fluorine-based resin comprises spherical particles comprising polytetrafluoroethylene and having a volume average particle diameter of 1 μm or less.

(5) The cleaning blade according to any one of above (1) to (4), wherein the second fluorine-based resin has been mixed with a fluorine-based oil.

(6) The cleaning blade according to above (5), wherein the fluorine-based oil has an average molecular weight of from 2,000 to 3,500.

(7) The cleaning blade according to any one of above (1) to (6), wherein the second fluorine-based resin is a polymer, copolymer, or terpolymer of one, two, or three members, respectively, selected from the group consisting of vinylidene fluoride, hexafluoropropylene, and tetrafluoroethylene.

(8) The cleaning blade according to any one of above (1) to (7), wherein a substrate of the cleaning blade has a monolayer structure of a polyurethane rubber or a multilayer structure of multiple polyurethane rubbers having different Martens hardness values.

(9) The cleaning blade according to any one of above (1) to (8), wherein the polyurethane rubber or each of the multiple polyurethane rubbers has a Martens hardness of from 0.5 to 2 N/mm$^2$.

(10) A lubricant leveling blade for leveling a lubricant applied onto a rotating body, the lubricant leveling blade comprising:

an edge layer having a tip portion that comes into contact with the rotating body; and a coating layer on the tip portion of the edge layer, wherein the coating layer contains a first fluorine-based resin and a second fluorine-based resin incompatible with the first fluorine-based resin, wherein the lubricant leveling blade has a Martens hardness of from 0.5 to 3 N/mm$^2$ at a position 20 μm distant from a tip edge portion of the edge layer.

(11) The lubricant leveling blade according to claim 10, wherein the tip edge portion has an angle θ of from 90° to 140°.

(12) A process cartridge comprising:

an image bearer;

at least one of:

a charger to charge a surface of the image bearer;

an irradiator to irradiate the charged surface of the image bearer to form an electrostatic latent image;

a developing device to develop the electrostatic latent image into a visible image; or a transfer device to transfer the visible image onto a recording medium; and a cleaning device to remove a residue on the surface of the image bearer, the cleaning device containing the cleaning blade according to any one of above (1) to (9).

(13) The process cartridge according to above (12), further comprising a lubricant applying device to apply a lubricant to the surface of the image bearer, the lubricant applying device containing the lubricant leveling blade according to above (10) or (11).

(14) An image forming apparatus comprising:

an image bearer;

a charger to charge a surface of the image bearer;

an irradiator to irradiate the charged surface of the image bearer to form an electrostatic latent image;

a developing device to develop the electrostatic latent image into a visible image;

a transfer device to transfer the visible image onto a recording medium;

a fixing device to fix the transferred visible image on the recording medium; and a cleaning device to remove a residue on the surface of the image bearer, the cleaning device containing the cleaning blade according to any one of above (1) to (9).

(15) The image forming apparatus according to above (14), further comprising a lubricant applying device to apply a lubricant to the surface of the image bearer, the lubricant applying device containing the lubricant leveling blade according to above (10) or (11).

The cleaning blades according to above (1) to (9), the lubricant leveling blades according to above (10) and (11), the process cartridges according to above (12) and (13), and the image forming apparatuses according to above (14) and (15) solve the various conventional problems and achieve the object of the present invention.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

This patent application is based on and claims priority to Japanese Patent Application Nos. 2021-021849 and 2021-107228, filed on Feb. 15, 2021 and Jun. 29, 2021, respectively, in the Japan Patent Office, the entire disclosure of each of which is hereby incorporated by reference herein.

REFERENCE SIGNS LIST

1 Image forming units
1Y Image forming unit (for yellow)
1C Image forming unit (for cyan)
1M Image forming unit (for magenta)
1K Image forming unit (for black)
10 Lubricant applying device
101 Fur brush
103 Solid lubricant
103*a* Lubricant pressing spring
103*b* Bracket
104 Lubricant leveling blade
104*a* Lubricant leveling blade tip surface
104*b* Lubricant leveling blade lower surface
104*c* Lubricant leveling blade contact part
1041 Lubricant leveling blade support
1042 Lubricant leveling blade substrate
14 Intermediate transfer belt
151 First sheet feeding cassette
152 Second sheet feeding cassette
151*a* First sheet feeding roller
152*a* Second sheet feeding roller
153 Sheet feeding path
154 Conveyance roller pair
162 Belt cleaning unit
162*a* Belt cleaning blade
2 Frame body
3 Photoconductor
3Y Photoconductor (for yellow)
3C Photoconductor (for cyan)
3M Photoconductor (for magenta)
3K Photoconductor (for black)
4 Charging roller
40 Optical writing unit
41 Polygon mirror
5 Developing device
51 Developing roller
52 Supply screw
53 Stirring screw
54 Doctor
55 Registration roller pair
6 Cleaning device
60 Transfer unit
62 Cleaning blade
62*a* Cleaning blade tip surface
62*b* Cleaning blade lower surface
62*c* Cleaning blade contact part
62*d* Cleaning blade side surface
621 Cleaning blade support
622 Cleaning blade substrate
622*a* Edge layer
622*b* Base layer
623 Coating layer
63 First bracket
64 Second bracket
66 Secondary transfer backup roller
67 Drive roller
68 Auxiliary roller
69 Tension roller
7 Primary transfer roller
7Y Primary transfer roller (for yellow)
7C Primary transfer roller (for cyan)
7M Primary transfer roller (for magenta)
7K Primary transfer roller (for black)
70 Secondary transfer roller
80 Fixing unit
81 Pressure heating roller
82 Fixing belt unit
83 Heating roller
84 Fixing belt
85 Tension roller
86 Drive roller
87 Ejection roller pair
88 Stack part
100Y Toner cartridge (for yellow)
100C Toner cartridge (for cyan)
100M Toner cartridge (for magenta)
100K Toner cartridge (for black)
500 Image forming apparatus
L Laser light
P Recording medium
θ Angle of blade corner

The invention claimed is:

1. A cleaning blade for cleaning a rotating body, the cleaning blade comprising:

an edge layer having a tip portion that comes into contact with the rotating body; and a coating layer on the tip portion of the edge layer, wherein the coating layer includes a first fluorine-based resin and a second fluorine-based resin incompatible with the first fluorine-based resin, wherein the cleaning blade has a Martens hardness of from 0.5 to 3 N/mm2 at a position 20 μm distant from a tip edge portion of the edge layer.

2. The cleaning blade according to claim 1, wherein the cleaning blade has a Martens hardness of from 0.5 to 2 N/mm2 at the position 20 μm distant from the tip edge portion of the edge layer.

3. The cleaning blade according to claim 1, wherein the cleaning blade has an average thickness of from 2.0 to 10.0 μm at the position 20 μm distant from the tip edge portion of the edge layer.

4. The cleaning blade according to claim 1, wherein the first fluorine-based resin comprises spherical particles comprising polytetrafluoroethylene and having a volume average particle diameter of 1 μm or less.

5. The cleaning blade according to claim 1, wherein the second fluorine-based resin has been mixed with a fluorine-based oil.

6. The cleaning blade according to claim 5, wherein the fluorine-based oil has an average molecular weight of from 2,000 to 3,500.

7. The cleaning blade according to claim 1, wherein the second fluorine-based resin is a polymer, copolymer, or terpolymer of one, two, or three members, respectively, selected from the group consisting of vinylidene fluoride, hexafluoropropylene, and tetrafluoroethylene.

8. The cleaning blade according to claim 1, wherein a substrate of the cleaning blade has a monolayer structure of a polyurethane rubber or a multilayer structure of multiple polyurethane rubbers having different Martens hardness values.

9. The cleaning blade according to claim 8, wherein the polyurethane rubber or each of the multiple polyurethane rubbers has a Martens hardness of from 0.5 to 2 N/mm2.

10. A process cartridge comprising:
an image bearer which is a rotating body;
at least one of:
a charger to charge a surface of the image bearer;
an irradiator to irradiate the charged surface of the image bearer to form an electrostatic latent image;
a developing device to develop the electrostatic latent image into a visible image; or
a transfer device to transfer the visible image onto a recording medium; and
a cleaning device to remove a residue on the surface of the image bearer, the cleaning device including the cleaning blade according to claim 1.

11. An image forming apparatus comprising:
an image bearer;
a charger to charge a surface of the image bearer;
an irradiator to irradiate the charged surface of the image bearer to form an electrostatic latent image;
a developing device to develop the electrostatic latent image into a visible image;
a transfer device to transfer the visible image onto a recording medium;
a fixing device to fix the transferred visible image on the recording medium; and
a cleaning device to remove a residue on the surface of the image bearer, the cleaning device including the cleaning blade according to claim 1.

12. A lubricant leveling blade for leveling a lubricant applied onto a rotating body, the lubricant leveling blade comprising:
an edge layer having a tip portion that comes into contact with the rotating body; and
a coating layer on the tip portion of the edge layer,
wherein the coating layer includes a first fluorine-based resin and a second fluorine-based resin incompatible with the first fluorine-based resin,
wherein the lubricant leveling blade has a Martens hardness of from 0.5 to 3 N/mm2 at a position 20 μm distant from a tip edge portion of the edge layer.

13. The lubricant leveling blade according to claim 12, wherein the tip edge portion has an angle θ of from 90° to 140°.

14. The process cartridge according to claim 10, further comprising:
a lubricant applicator to apply a lubricant to the surface of the image bearer; and
a lubricant leveling blade including:
an edge layer having a tip portion that comes into contact with the rotating body; and
a coating layer on the tip portion of the edge layer of the lubricant leveling blade,
wherein the coating layer of the lubricant leveling blade includes a first fluorine-based resin and a second fluorine-based resin incompatible with the first fluorine-based resin,
wherein the lubricant leveling blade has a Martens hardness of from 0.5 to 3 N/mm2 at a position 20 μm distant from a tip edge portion of the edge layer.

15. The image forming apparatus according to claim 11, further comprising:
a lubricant applying device to apply a lubricant to the surface of the image bearer, the lubricant applying device including a lubricant leveling blade comprising:
an edge layer having a tip portion that comes into contact with a rotating body which is the image bearer; and
a coating layer on the tip portion of the edge layer,
wherein the coating layer of the lubricant leveling blade includes a first fluorine-based resin and a second fluorine-based resin incompatible with the first fluorine-based resin,
wherein the lubricant leveling blade has a Martens hardness of from 0.5 to 3 N/mm2 at a position 20 μm distant from a tip edge portion of the edge layer.

* * * * *